(12) United States Patent
Dittus et al.

(10) Patent No.: US 11,738,341 B2
(45) Date of Patent: Aug. 29, 2023

(54) DISPENSING OF HIGHLY VISCOUS LIQUIDS

(71) Applicant: Roche Molecular Systems, Inc., Pleasanton, CA (US)

(72) Inventors: Jenny Dittus, Walzbachtal (DE); Tobias Walz, Straubenhardt (DE); Andreas Hecht, Pforzheim (DE); Jubin Kashef, Karlsruhe (DE); Volker Barenthin, Neulingen (DE)

(73) Assignee: Roche Molecular Systems, Inc., Pleasanton, CA (US)

( * ) Notice: Subject to any disclaimer, the term of this patent is extended or adjusted under 35 U.S.C. 154(b) by 34 days.

(21) Appl. No.: 17/171,989

(22) Filed: Feb. 9, 2021

(65) Prior Publication Data

US 2021/0245155 A1 Aug. 12, 2021

(30) Foreign Application Priority Data

Feb. 10, 2020 (EP) ..................................... 20156402

(51) Int. Cl.
*B01L 3/00* (2006.01)
(52) U.S. Cl.
CPC ... *B01L 3/502715* (2013.01); *B01L 3/502738* (2013.01); *B01L 2400/0487* (2013.01)

(58) Field of Classification Search
CPC ......... B01L 3/502715; B01L 3/502738; B01L 2400/0487
USPC .......................................................... 422/50
See application file for complete search history.

(56) References Cited

FOREIGN PATENT DOCUMENTS

| EP | 3222351 A1 | 9/2017 | |
|---|---|---|---|
| WO | WO2008/109422 A1 * | 9/2008 | ............... G01N 1/30 |
| WO | 2013111025 A1 | 8/2013 | |
| WO | 2014028537 A1 | 2/2014 | |

* cited by examiner

*Primary Examiner* — Christine T Mui
(74) *Attorney, Agent, or Firm* — Maneesh Gupta

(57) ABSTRACT

The present disclosure is directed to a dispensing system for providing a preset small volume of liquid ≤200 µl into a filling area of a microfluidic sample carrier comprising at least one flow channel, the system including, inter alia, at least one interface unit provided for each flow channel of the microfluidic sample carrier, with each interface unit comprising an injector with an injection channel, wherein the cross section of an outlet part of the injection channel is larger than a cross section of an inlet part of the injection channel and of the middle part of the injection channel. Furthermore, the present disclosure relates to a respective microfluidic sample carrier sealing system and to a respective method of dispensing sealing liquid into a microfluidic sample carrier.

15 Claims, 7 Drawing Sheets

DISPENSING OF HIGHLY VISCOUS LIQUIDS

CROSS-REFERENCE TO RELATED APPLICATION

This application claims the benefit and priority of European Application Serial No. 20156402.8, filed Feb. 10, 2020, which is incorporated herein by reference.

TECHNICAL FIELD

In general, the present disclosure relates to the technical field of preparation of sample analysis, such as the analysis of biological samples, and further to the technical field of preparation of high throughput analysis of biological samples.

In particular, the present disclosure is directed to a dispensing system for providing a preset liquid volume into a filling area of a microfluidic sample carrier comprising at least one flow channel providing an array of microwells as reaction chambers for chemical or biological reactions. Here, it is often a goal to be able to carry out multiple different assays of one or more test samples on the same, often disposable, microfluidic sample carrier, for example by thermal cycling. Accordingly, in order to be able to further process the test samples, the array of microwells prefilled with test sample and e.g. multiple different reagents must be sealed in order to avoid cross-contamination, or the like. Thereby, independently analyzing one or more test samples with multiple different reagents in the course of a single analytic process can be achieved, with only small amounts of test sample necessary. Based thereon, the present disclosure is also directed to a microfluidic sample carrier sealing system for filling such a microfluidic sample carrier with a preset small volume of sealing liquid using the aforementioned liquid dispensing system, and also to a method of dispensing sealing liquid into a prefilled microfluidic sample carrier by means of the aforementioned microfluidic sample carrier sealing system. In other words, the present disclosure is directed to an improved system and method with which sealing liquid can be put into use with a microfluidic sample carrier as thoroughly and as productive as possible.

BACKGROUND

In the field of diagnostic technology for the assay of chemical or biochemical reactions, it is a major goal to be able to carry out multiple different assays on one or more test samples on the same—preferably disposable—microfluidic sample carrier, thereby providing methods of independently analyzing one or more test samples with multiple different reagents in the course of a single analytical process. In order to be able to achieve this goal accurately, methods have been developed over the years, such as the widely known Polymerase Chain Reaction (PCR), for example in the form of a real-time PCR, digital PCR (dPCR) or multiplex PCR, which enable the in vitro synthesis of nucleic acids in a biological sample, through which a DNA segment can be specifically replicated, i.e. a cost-effective way to copy or amplify small segments of DNA or RNA in the sample.

Evidently, it is desired to make the above described diagnostic assays such as dPCR faster, cheaper and simpler to perform while achieving precision as well as efficiency of conventional laboratory processes. In this regard, substantial effort has been made to improve miniaturization and integration of various assay operations, in order to be able to increase the number of parallel assays on one single microfluidic sample carrier. As an example of such a microfluidic sample carrier, microfluidic devices, such as microfluidic chips, also referred to as digital polymerase chain reaction (dPCR) chips, have been developed, which provide microscale channels and microscale reaction areas receiving microliter or nanoliter-scale samples in the form of streamable sample liquid, such as aqueous sample liquid. Microliter-scale reagents, typically filled in advance into an array of small wells, i.e. microwells or nanowells provided as reaction areas on the microfluidic chip, are placed therein for contacting a stream of sample liquid streamed through a flow channel, wherein each type of assay is dependent on the reagents loaded into the array of reaction areas as well as the conFiguration of flow channels and detectors, wherein the filling of sample liquid into the microfluidic chip can be implemented by means of pipetting the sample liquid into the chip. This advanced technology allows a plurality of assays to be carried out simultaneously on a miniaturized scale. Most of these chemical, biochemical and/or biological assays are directed to the immobilization of biological materials such as polypeptides and nucleic acids, cells or tissues within the wells and the performance of one or more reactions with the immobilized material, followed by a quantitative and/or qualitative analytical process, such as luminescence test measurements.

Usually, for conducting a dPCR assay, the known dPCR chip is initially filled with an aqueous dPCR reaction mixture, usually consisting of a biological sample and PCR master mix, wherein the dPCR reaction mixture is introduced by means of a pipette or the like into the inlet opening, and typically flows passively by capillary forces into the array of wells of the chip until the capillary filling process comes to a stop. Thereafter, an immiscible separation or sealing fluid, such as silicone oil or the like, is pressed through the inlet opening into the flow channel which, at first, pushes any remaining dPCR reaction mixture into any remaining empty wells, and, covers filled wells, thereby fluidically separating the individual wells from their surroundings and, in particular, from each other in order to avoid any sample condensation, cross contamination or pollution. After the initial filling process and the subsequent sealing process are finished, the dPCR chip is usually subjected to thermal cycling, wherein—in the course of a typical PCR conduct—a specific target nucleic acid is amplified by a series of reiterations of a cycle of steps in which nucleic acids present in the dPCR reaction mixture are (a) denatured at relatively high temperatures, for example at a denaturation temperature of more than 90° C., usually about 94-95° C., for separation of the double-stranded DNA, then (b) the reaction mixture is cooled down to a temperature at which short oligonucleotide primers bind to the single stranded target nucleic acid, for example at an annealing temperature of about 52-56° C. for primer binding at the separated DNA strands in order to provide templates (annealing), and, thereafter, (c) the primers are extended/elongated using a polymerase enzyme, for example at an extension temperature at about 72° C. for creation of new DNA strands, so that the original nucleic acid sequence has been replicated. Generally, each well that contains one or more targets will yield a positive signal, wherein, after thermal cycling, the ratio of positive and negative signals will allow to accurately calculate the initial target concentration in the sample, for example by means of luminescence test measurements. Such technologies allow a plurality of assays to be carried out simultaneously on a miniaturized scale.

However, when actually miniaturizing the reaction chamber volumes for the same to become microfluidic structures of a microfluidic sample carrier, such as the above mentioned dPCR chip, in order to generate the desired small dimensions, several already known problems increase, such as the undesired introduction of gas bubbles into the microfluidic sample carrier. Lying in the focus of the present disclosure, gas bubbles existent within the microfluidic structure of a microfluidic sample carrier can constitute a severe problem since gas bubbles circulating through such microfluidic system can not only damage the microfluidic structure of any kind of sensor used therein, but can also damage the biological sample of interest due to causing undesired mixing of samples in neighboring microwells, resulting in undesired cross-contamination and, thus, substantial experimental errors and false assay results. Accordingly, gas bubbles entrapped within a microfluidic sample carrier not only already falsify detection signals but will even thermo-expand when carrying out dPCR with such microfluidic sample carrier to the required maximum thermocycling temperature of approximately 95° C. in such a way that a secure separation of adjacent wells can no longer be ensured and undesired cross contamination is highly likely.

Accordingly, the need exists to achieve the filling of a microfluidic sample carrier with sealing fluid without contamination and without accidentally introducing gas bubbles and, thus, without initial gas bubble entrapment within the wells. In this regard, a clean and controlled drop break-off behavior of sealing liquid at its dispenser at the time of filling the microfluidic sample carrier therewith is one of or even the most important of several characteristics of a sealing liquid filling process, which behavior is influenced by various physical variables of the sealing liquid itself, such as viscosity, contact angle and surface tension. Due to gravity, a low surface tension as usually exhibited by sealing liquids causes the sealing liquid to creep out of a dispenser and, thus, increases the risk of an uncontrolled drop break-off. Accordingly, since the particular character of sealing liquids results in a rather indeterminable drop break-off behavior, precise delivery of small volumes, such as volumes of about ≤200 µl, becomes highly problematic. Also, the kinetic energy of a falling droplet potentially generates droplets on impact. These droplets spatter uncontrollably and can contaminate the environment. Thus, a defined and controlled liquid release of sealing liquid during filing of a microfluidic sample carrier is very important in order to be able to prevent gas bubbles and also contamination manifesting itself during the dispensing process by uncontrolled drop break-off or droplet splashes. In this regard, it is important to consider that silicone oil has a much higher viscosity with a simultaneously reduced contact angle and reduced surface tension, i.e. such sealing liquids have a tendency to spread wetting, meaning that they do not form a drop on a surface or only form a drop for a short time and, thus, are distributed throughout the entire periphery of a dispensing point depending on surface condition, surface energy, surface tension and contact angle. For example, due to low surface tension, hydrostatic influences on sealing liquids must be taken into account, since e.g. seals that seal against water can fail easily with the sealing liquid, thereby allowing creep leakage. This behavior can lead to cross-contamination between two sample carriers and to endangering the function of the peripherals over time.

Different solutions have been proposed in the past in order to overcome the mentioned problems and to get the problematic behavior of sealing liquid under control. However, the previously proposed solutions did not provide sufficient results, since, inter alia, hydrostatic influences, material properties, or flushing behavior has not fully been considered. Accordingly, the present disclosure focuses on the need that sealing liquid can first be streamed into a respective dispensing system and, subsequently, be precisely discharged into a microfluidic sample carrier, without contamination of the periphery and without introduction of undesired gas bubbles.

SUMMARY OF THE DISCLOSURE

Accordingly, the disclosure provides a dispensing system for providing a preset small volume of liquid ≤200 µl into a filling area of a microfluidic sample carrier comprising at least one flow channel, the system including a liquid reservoir, a liquid pump connected to the liquid reservoir, at least one interface unit provided for each flow channel of the microfluidic sample carrier, wherein the liquid is provided to each flow channel via a respective interface unit, a conduit member comprising a supply channel connecting the liquid pump and each interface unit, a first valve connected to the supply channel, and at least one second valve arranged between the supply channel and a respective interface unit, wherein each interface unit comprises an injector connected to the conduit member, with each injector comprising a main body and an injection channel, each injection channel includes an inlet part for receiving liquid from the supply channel, an outlet part for dispensing liquid into a sample carrier liquid inlet, and a middle part for guiding liquid from the inlet part to the outlet part, with the outlet part ending in an outlet opening of the injector, and a cross section $\varnothing_{in}$ of the inlet part, a cross section $\varnothing_{mid}$ of the middle part and a cross section $\varnothing_{out}$ of the outlet part, wherein of each injection channel meet the following conditions:

$$\varnothing_{out} > \varnothing_{in}; \text{ and}$$

$$\varnothing_{out} > \varnothing_{mid}.$$

The disclosure also provides a microfluidic sample carrier sealing system for filling a microfluidic sample carrier with a preset small volume of sealing liquid ≤200 µl, the microfluidic sample carrier filling system comprising
the dispensing system as described herein, and
a microfluidic sample carrier comprising a filling area, an outlet area, and at least one flow channel, at least one liquid inlet of the filling area being prefilled with sample liquid,
wherein monitoring means are provided for each flow channel of the microfluidic sample carrier, which monitoring means are for monitoring a filling of the respective flow channel.

Finally, the disclosure provides a method of dispensing sealing liquid into a microfluidic sample carrier with a dispensing system as described herein, including the steps of
(S1) opening the first valve of the dispensing system,
(S2) flushing the supply channel with sealing liquid by pumping sealing liquid into the supply channel, wherein excessive sealing liquid potentially including air bubbles can be discharged through the open first valve,
(S3) closing the first valve, thereby generating a closed hydraulic sealing liquid column within the supply channel, (S4) opening second valves individually and successively for connecting each injection channel with the supply channel and flushing each injector with sealing liquid, and (S5) pumping further sealing liquid into the supply channel, wherein excessive sealing liquid potentially including air bubbles can be discharged through the respective injector, and closing the second valves again, wherein the method further comprises the steps of (S6) arranging a microfluidic sample carrier to be filled with sealing liquid and comprising a filling area, an outlet area, and at least one flow channel, with at least one liquid inlet of the filling area being prefilled with sample liquid at the dispensing system, wherein each injection unit is aligned with a liquid inlet of each flow channel, (S7) opening the second valves and pumping a preset volume of sealing liquid through the supply channel into the filling area of the microfluidic sample carrier, (S8) closing each second valve immediately after the volume delivery for achieving a constant drop break-off at the outlet opening of each injector, (S9) drawing sealing liquid from the supply channel by the liquid pump and opening the first valve, for overpressure compensation, (S10) closing the first valve, (S11) opening the second valves individually and successively for connecting each injection channel with the supply channel, and (S12) drawing further sealing liquid from the supply channel by the liquid pump for removing potential residue sealing liquid at the outlet opening of the injector.

DETAILED DESCRIPTION

Figure 1:
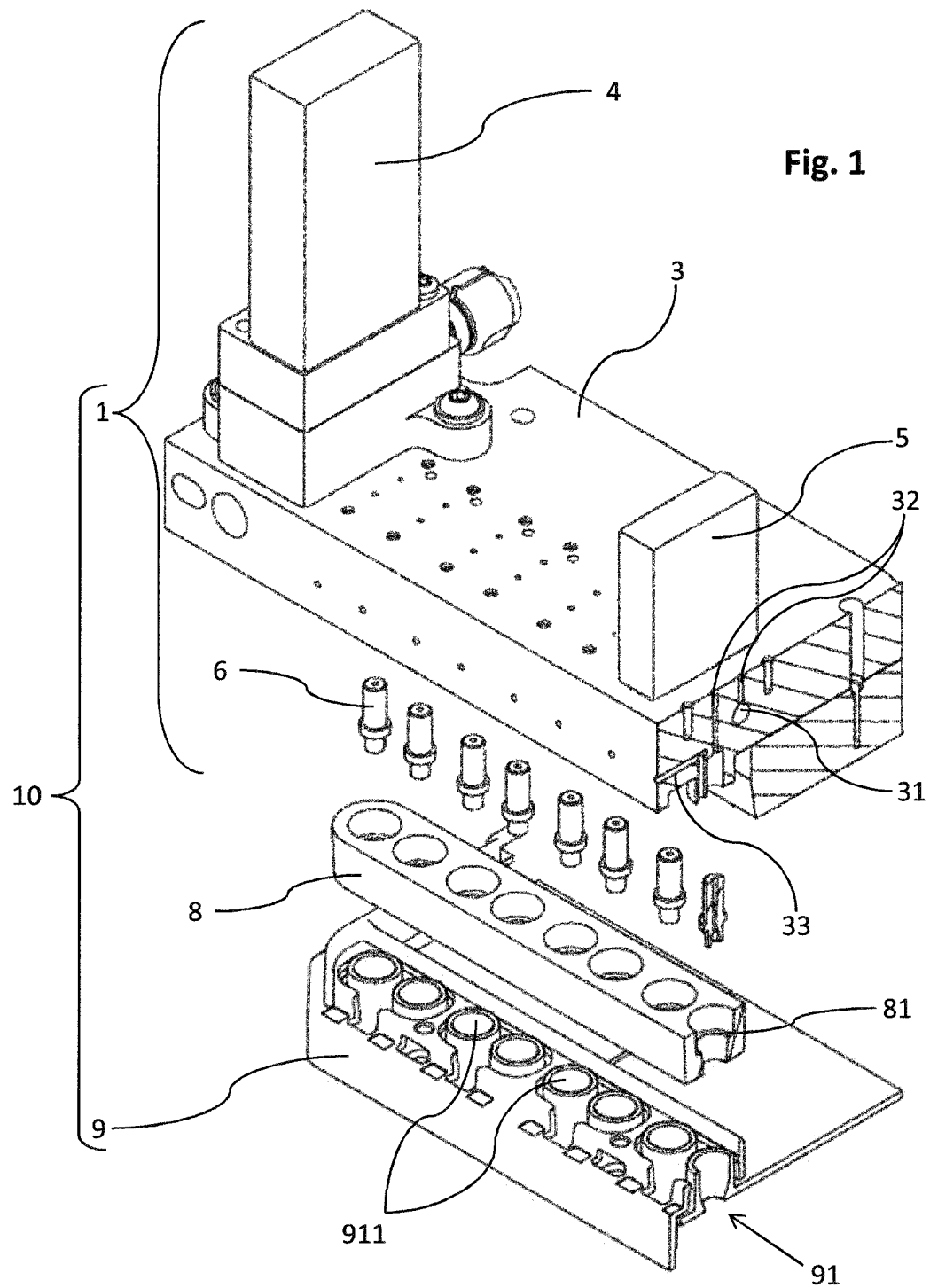
FIG. 1 is a partially cut conceptual perspective view of a dispensing system according to an embodiment of the present disclosure in an exploded manner, with a microfluidic sample carrier arranged below.

The present disclosure addresses the above described problems by means of a dispensing system for providing a preset small volume of liquid ≤200 μl into a filling area of a microfluidic sample carrier comprising at least one flow channel. The dispensing system of the present disclosure includes a liquid reservoir, such as a sealing liquid reservoir for providing highly viscous sealing liquid, which sealing liquid can exhibit a kinematic viscosity of up to 100 mm$^2$/s and a surface tension of up to 20 mN/m, such as silicone oil, a liquid pump connected to the liquid reservoir, and at least one interface unit provided for each flow channel of the microfluidic sample carrier, e.g. in the form of a dPCR chip or the like, with each interface unit being used to provide the liquid to each flow channel. The dispensing system of the present disclosure further includes a conduit member comprising a supply channel connecting the liquid pump and each interface unit, a first valve connected to the supply channel, also referred to as prime valve, and at least one second valve arranged between the supply channel and a respective interface unit, also referred to as switching valve. Here, the first valve of the dispensing system of the present disclosure can be connected to the supply channel at its downstream end, and can act as a waste valve. In regard to the term "downstream", the same specifies a position in the supply channel of the above described liquid guidance system at a location further down the liquid stream than the source of the liquid stream, i.e. the liquid reservoir. A similar definition applies of the term "upstream" as used later on. Accordingly, a position the "most upstream" within the liquid guidance system would be the liquid reservoir, whereas the "most downstream" position would be a location at which the liquid cannot be guided further, such as a dead end, or where the liquid exits the liquid guidance system, such as an outlet or the like. Thus, the term "downstream" is to be understood in flow direction of the liquid stream, and the term "upstream" is to be understood against the flow direction of the liquid stream.

Furthermore, each interface unit, which constitutes the smallest liquid dispensing unit and can be multiplied within a system, comprises an injector connected to the conduit member, with each injector exhibiting a main body and an injection channel. Here, each injection channel includes an inlet part for receiving liquid from the supply channel, an outlet part for dispensing liquid into a sample carrier liquid inlet, and a middle part or guiding part for guiding liquid from the inlet part to the outlet part, with the outlet part ending in an outlet opening of the injector. Moreover, a cross section $\varnothing_{in}$ of the inlet part, a cross section $\varnothing_{mid}$ of the middle part and a cross section $\varnothing_{out}$ of the outlet part of each injection channel meet the conditions $\varnothing_{out} > \varnothing_{in}$ and $\varnothing_{out} > \varnothing_{mid}$, i.e. the cross section $\varnothing_{out}$ of the outlet part of each injection channel is larger than the cross section $\varnothing_{in}$ of the inlet part of the respective injection channel, and the cross section $\varnothing_{out}$ of the outlet part of each injection channel is larger than the cross section $\varnothing_{mid}$ of the middle part of the respective injection channel. In this context, the term "cross section" particularly relates to the respective diameter, also referred to as inner diameter, of the respective part/section/segment of the injection channel, i.e. the bore diameter of the borehole constituting the injection channel at this specific part/section/segment of the injection channel. With such particularly developed geometry of the injector channel of an interface unit of a dispensing system, uncontrolled escape of liquid from the injector can be prevented. As an example for such dimensioning, the cross section $\varnothing_{in}$ of the inlet part of the respective injection channel can be between 0.7 mm and 0.9 mm, for example 0.8 mm, the cross section $\varnothing_{mid}$ of the middle part of the respective injection channel can be between 0.4 mm and 0.6 mm, for example 0.5 mm, and the cross section $ø_{out}$ of the outlet part of each injection channel can be between 1.1 mm and 1.3 mm, for example 1.2 mm.

In the course of a usual dispensing operation, liquid to be dispensed is conveyed from the supply channel to each interface unit, and, in further detail, through the inlet part into the guide part and further into the outlet part of the injector. In the course of the streaming of the liquid from the middle part to the cross-sectionally larger outlet part of an injection channel of an interface unit in accordance with the present disclosure, pressure of the flow of liquid through the injection channel is reduced and the liquid expands, which results in an improved controllability of drop break-off at the outlet opening and prevents uncontrolled escape of liquid from the injector. Accordingly, the geometry of each injector is designed in such a way that a controlled drop break-off can be guaranteed, in particular when using suitable dispensing parameters for the liquid to be dispensed. Thereby, controlled liquid dispense can be achieved. In this regards, certain actuators of the dispensing system can be controlled via parameters, such as the liquid pump, a respective pressure generator, a pressure control means, the first valve and the second valve(s), amongst others. Thereby, it is possible to influence the dispensing of liquids with different viscosities and surface tensions when using a dispensing system as described above.

As mentioned above, by particularly dimensioning the internal structure of each injector, i.e. its injection channel, uncontrolled drop separation can be avoided, which uncontrolled drop separation would lead to inaccuracies in regard to a precise volume delivery. Accordingly, the particularly designed flow geometry of the liquid discharge by the injector, in particular in combination with a predetermined parameterization of the liquid pump and the valves arranged downstream thereof, results in the desired controlled precise dispensing of a preset small volume of liquid, such as silicone oil, in volumes ≤200 µl into the filling area of a microfluidic sample carrier. In addition, with the particular structure of the previously described dispensing system of the present disclosure, flushing of the entire flow line from the liquid reservoir to the outlet opening can be achieved, in order to remove bubbles and the like, i.e. bubble-free flushing of flow manifold and injectors, to avoid bubble formation and incorrect volumes during the dispensing process.

In general, with the dispensing system in accordance with the present disclosure, a flushing/priming process can be divided into a phase of flushing the periphery and the distributor, and a subsequent phase of flushing the injectors. In this regard, the first valve i.e. the prime valve is opened first and, via the inlet of the pump, liquid is first pumped into its return flow through the open prime valve. Then, the first valve is closed, thereby generating a closed liquid column standing within the supply channel. In doing so, a small gas cushion might have formed in front of the second valves, which can be driven out in the further flushing process. Especially during initial flushing, turbulence within the liquid of the initial flushing flow can trap atmospheric fluid, such as air, in the liquid, which can lead to an undesired air/liquid mixture within the conduit member of the dispensing system. Such air/liquid mixture is particularly problematic since any bubbles resulting therefrom and being dispensed by an injector can collapse on exit and, thus, can contaminate the periphery around the injector. Bubble collapsing would be noticeable during dispensing of the liquid by generating an inaccurate drop break-off behavior and, thus, by dispensing incorrect volumes. With the structure of the dispensing system of the present disclosure, however, the potentially problematic air/liquid mixture can now be safely removed via return flow through the open prime valve. Only afterwards, the injectors can be vented/primed without being contaminated by potentially collapsing air bubbles. Accordingly, after the supply channel has been flushed and, thus, all potential bubbles have been removed from the supply channel, each injection channel can be connected individually and serially to the liquid column within the supply channel, by means of opening a respective second valve i.e. switching valve of the respective interface unit. In doing so, any undesired gas pockets, such as air bubbles, remaining in the system can be expelled one after the other by the injectors. Thereby, controlled serial priming can be achieved. To flush the system initially, a collection vessel can be placed underneath the dispensing system, i.e. underneath each injector, in order to collect flushed-out liquid. Such collection vessel can be implemented as collection pan or the like, from which the flushed-out and collected liquid can be pumped or guided into a waste container. Alternatively, an empty microfluidic sample carrier can be placed underneath the dispensing system for collecting the flushed-out liquid, which microfluidic sample carrier can then be disposed of.

In regard to the liquid to be dispensed, it has already been indicated that the same can be a sealing liquid for sealing samples within microwells in a respective microfluidic sample carrier. As an example, the silicone oil can be a fluorine or fluorinated silicone oil, which exhibits desired properties, such as the demand for optical quality since a camera system used to optically analyse the samples within the microwells in the microfluidic sample carrier at a later stage, resulting in the necessity that the used sealing liquid must provide certain light-transmissive qualities. Here, it has to be noticed that fluorine oil has a high viscosity. Thus, in case fluorine oil is aspirated with a small tube diameter and a too high aspiration speed, there is a risk of outgassing effects in the oil, potentially creating micro bubbles, which can disturb the further process, especially in optical applications. In order to prevent such outgassing, fluorine oil should be aspirated at a low aspiration speed by the liquid pump. However, with the present disclosure, any bubbles can be flushed out of the system, thereby reducing any undesired properties of fluorine oil.

In addition, and as further embodiment of the dispensing system of the present disclosure, the cross section $ø_{in}$ of the inlet part, the cross section $ø_{mid}$ of the middle part and the cross section $ø_{out}$ of the outlet part of each injection channel can meet the condition $ø_{out} > ø_{in} > ø_{mid}$. Thus, the liquid is conveyed from a cross-sectionally larger inlet part to a cross-sectionally smaller middle part, thereby increasing back pressure due to the cross-sectional reduction. Here again, as an example for such dimensioning, the cross section $ø_{in}$ of the inlet part of the respective injection channel can be between 0.7 mm and 0.9 mm, for example 0.8 mm, the cross section $ø_{mid}$ of the middle part of the respective injection channel can be between 0.4 mm and 0.6 mm, for example 0.5 mm, and the cross section $ø_{out}$ of the outlet part of each injection channel can be between 1.1 mm and 1.3 mm, for example 1.2 mm. Additionally or alternatively, a length $l_{in}$ of the inlet part, a length $l_{mid}$ of the middle part and a length $l_{out}$ of the outlet part of each injection channel can meet the condition $l_{mid} \geq l_{out}$, wherein the condition $l_{in} \geq l_{mid} > l_{out}$ can also be met. As an example for such lengthwise dimensioning, the length $l_{in}$ of the inlet part can be between 3 mm and 5 mm, for example about 4 mm, the length $l_{mid}$ of the middle part can also be between 3 mm and 5 mm, for example about 4 mm, and the length $l_{out}$ of the outlet part can be between 1.5 mm and 2.5 mm, for example about 2 mm. Here, the term "length" of a part of the injection channel is to be understood as a length of the extension of the respective part of the injection channel along its longitudinal axis, i.e. along the longitudinal axis of the main body of the injector. With the previously mentioned optional structural features of each interface unit, volume delivery by means of the dispensing system as described above can be further improved, resulting in further reducing or completely avoiding uncontrolled drop separation and, thus, avoiding any inaccuracies in regard to a precise volume delivery.

Based on the dispensing system of the present disclosure, an end surface of the injector's main body at the outlet opening can be kept to a production-related minimum in order to reduce contact surface for the liquid to be dispensed from the outlet opening. Thereby, creeping of sealing liquid outside of the injector can further be avoided. Alternatively or additionally, an inner circumference of the downstream end of the outlet part of each injection channel can comprise an outlet chamfer enlarging its cross section $\varnothing_{out}$, wherein the outlet chamfer, also referred to as bevel or phase of the outlet at its downstream end, can take on an angle of 40° to 50°, such as 45°. With such an outlet chamfer, the avoidance of creeping of sealing liquid outside of the injector can further be improved. Moreover, with the dispensing system of the present disclosure, a passage chamfer can be provided between the inner circumference of the inlet part and the inner circumference of the middle part of each injection channel, which passage chamfer can take on an angle of about 28°. With such particular geometrical structure, the flow of liquid conveyed from a cross-sectionally larger inlet part to a cross-sectionally smaller middle part can be smoothened, thereby increasing back pressure due to the cross-sectional reduction but, at the same time, avoiding sharp pressure peaks.

As an alternative embodiment of the dispensing system of the present disclosure, the main body of each injector can be made of a plastic material exhibiting low surface energy, such as Polytetrafluoroethylene, PTFE. In this regard, besides the structural problems of previously suggested injectors in regard to their unsuitable dimensioning of usually cross-sectionally too large inner channels, materials proposed for injectors in the past always exhibit unfavorable surface properties. As confirmed by the inventors of the present disclosure, with the previously proposed injectors, each time a droplet volume is to be formed by such injector, part of the volume creeps up and contaminates the injector due to surface energy and surface roughness. In this regard, it should be considered that, with decreasing surface tension, the contact angle of a liquid to the surface is also reduced, which, again increases wetting ability. Thus, in order to minimize this so-called spreading wetting, the injector is made of a material with a very low surface energy, such as PTFE or a fluoropolymer material, i.e. the injector of the present disclosure can be made of a special plastic already itself preventing liquid from settling on the surface of the injector, thereby further improving the ability of the inventive dispensing system of controlled precise dispensing of a preset small volume of liquid, such as non-polar silicone oil, in volumes ≤200 µl.

In the course of another alternative embodiment of the dispensing system of the present disclosure, the dispensing system can further comprise an air supply unit for providing pressurized or compressed air to each flow channel of the microfluidic sample carrier, wherein the air supply unit can comprise a pressurized-air reservoir, an air pressure regulator and an air supply channel connected to an air outlet nozzle. Also, the air outlet nozzle can be arranged adjacent to the outlet opening of the injector. Thereby, air and liquid can be supplied to the sample carrier by the described dispensing system via the at least one common interface unit. Thus, each interface unit provides for a switchable liquid delivery and a controlled compressed air delivery. Thereby, an overpressure can be generated above the filling area of the sample carrier, in order to guide the liquid volume through the sample carrier's flow channel(s). With applying uniform pressurization, it is possible to press the sealing liquid constantly through the flow channel of the microfluidic sample carrier, in order to achieve an even distribution of the liquid over the entire reaction path of the microfluidic sample carrier. In this regard, in order to generate a constant, pulsation-free target pressure, a supply pressure is first applied to a pressure accumulator such as the previously mentioned reservoir, which is then connected to a pressure regulator which regulates the target pressure to be delivered to the sample carrier. In other words, injection and pressurization are locally combined and arranged above the filling area of the sample carrier. Thus, with the described dispensing system, it becomes possible to switch from liquid delivery to pressurization without time delay. In addition, with the described dispensing system which can comprise several interface units, several channels of a sample carrier can be supplied simultaneously.

In order to avoid any pressure loss or cross-contamination, a connection between liquid outlet opening/air outlet nozzle and microfluidic sample carrier can be sealed. With such sealed connection between microfluidic sample carrier and dispensing system, the target pressure in the filling area of the carrier can be maintained. Accordingly, a sealing member can be attached to the conduit member, surrounding, both the outlet part/outlet opening of the injector and the air outlet nozzle of each interface unit, for sealing any liquid or air transfer between the conduit member and the microfluidic sample carrier to the outside. Here, in the case of a plurality of interface units and air outlet nozzles, the sealing member can be implemented as an elongated sealing member, such as a bar-shaped member or the like, with a respective plurality of bores, each of which is formed to surround a combination of outlet opening and air outlet nozzle of one interface unit. Thus, in general, the sealing member can be a sealing body with an inner bore basically tapered in-part towards the microfluidic sample carrier, the inner bore surrounding each combination of outlet opening and air outlet nozzle. In regard to a lengthwise extension, the air outlet nozzle of each interface unit can be arranged within the inner bore of the sealing body, whereas the outlet opening of the injector can be arranged outside of the sealing body, i.e. protruding from the sealing body to the outside, towards the microfluidic sample carrier.

By means of another alternative embodiment of the dispensing system of the present disclosure, the liquid pump can comprise a controllable volume displacement actuator, such as a stepper motor, and a changeover valve, such as an electromagnetic valve, for enabling a changeover of a conveying direction of the liquid pump. With such a bidirectional liquid pump, the liquid pump connected to the liquid reservoir can also be referred to as dosing pump, since the same can be used to dose the liquid volume to be pumped. Here, the liquid pump can be implemented as a pump which can take up a certain maximum volume of liquid to be pumped. This can be achieved by volume displacement in a pump head of the liquid pump. Thus, after dispensing, the liquid pump reverses by a few µl to draw back potential droplets potentially remaining at the outlet opening into the injector. Then, the liquid pump can take up its maximum allowable volume and release the same over several dispensing steps. In order to achieve an effective operation of the pump, respective parameters such as dispensing speed, acceleration ramps and/or deceleration ramps of the pump head can be set by using the controllable volume displacement actuator. Further, with the electromagnetic changeover valve used as pump valve in order to switch the flow direction of the pump, it becomes possible to reverse the flow of the pump without activating the second valve/switching valve, resulting in a volume on the delivery side to be withdrawn, which can significantly assist a controlled drop break-off at the outlet opening of the respective interface unit. In addition, a delay between pump move and valve switch can be adapted to the respective process. Accordingly, with such liquid pump, not only is the liquid to be dispensed separated on the respective channels of the sample carrier, but the entire system can initially be flushed before the start of the actual dispensing process.

In other words, in order to ensure a constant and precise volume dispense of the liquid, the design of the flow channels and the dispensing geometry together with a parameterization of the actuators required for media flow and the monitoring of media flow in combination results in that it becomes possible to pump sealing liquids with kinematic viscosities of up to 100 mm$^2$/s and surface tensions of up to 20 mN/m bubble-free and dispense them precisely. Accordingly, the present disclosure mainly focuses on the previously described dispensing system to which a microfluidic sample carrier can be connected. Its filling can be controlled by different functional parts, i.e. a liquid distributor for delivering a preset volume of the sealing liquid into the filling area of the sample carrier, a compressed air distributor for applying an overpressure over the filling area of the sample carrier after the preset volume of sealing liquid has been delivered, which displaces the sealing liquid volume and generates a constant flow which moves the medium through the sample carrier, and a process monitoring means for monitoring the flow rate of the constant flow in order to be able to interrupt the flow in time when the system limit is reached, by monitoring the yield point in several phases of the filling/dispensing process. One of the advantages of the present disclosure lies within the great flexibility of the inventive dispensing system in relation to the physical variables which the respective medium to be dispensed brings with it, allowing direct influence to be exerted on the type of delivery and conveyance in the sample carrier. Here, additionally in order to achieve an exact volume delivery, a complete hydraulic column is to be formed in the inventive system, meaning that no flexibility may occur due to any air pockets or gas bubbles since initial air bubbles are discharged from the system. In this regard, it can be advantageous that the liquid reservoir, also referred to as liquid storage tank, is located at a similar level or in a position below the liquid pump, and a branch can be located behind the liquid reservoir. With this arrangement, a first line is connected to a suction side of the liquid pump, and an end of a second line is arranged above the liquid reservoir, serving as a vent. Due to the position of the liquid reservoir in relation to the liquid pump, the reservoir can be prevented from being drained by the liquid pump when the dispensing system is switched off and the switching states of the valves and liquid pump are undefined. Also, the level of the liquid reservoir can be determined by means of counting the pre-defined pump strokes. Alternatively or additionally, the liquid reservoir can also be provided with a capacitive sensor system, with which a level in the reservoir can be determined. For example, the capacitive sensor system can comprise an electrode attached to a lance extending through the reservoir, and another electrode implemented by the ground of the reservoir, wherein an electric field can be measured between the two electrodes. Thereby, with dropping liquid level, capacity changes can be measured, reflecting the filling level of the liquid reservoir. Thus, the liquid level within the liquid level can be monitored continuously.

According to a further aspect of the present disclosure, a microfluidic sample carrier sealing system for filling a microfluidic sample carrier with a preset small volume of sealing liquid 200 µl is provided. In further detail, the microfluidic sample carrier filling system comprises a dispensing system as previously described, and also a microfluidic sample carrier, such as a disposable microfluidic sample carrier, i.e. a consumable, which can be implemented in the form of a microfluidic device, such as a microfluidic chip, also referred to as digital polymerase chain reaction (dPCR) chip. The microfluidic sample carrier comprises an filling area, an outlet area, and at least one flow channel, preferably a plurality of flow channels, wherein each flow channel exhibits a liquid inlet connected to the outlet area by a respective flow channel, wherein the liquid area, i.e. each liquid inlet can be prefilled with sample liquid before introducing sealing liquid, for example by means of pipetting sample liquid into each liquid inlet. Furthermore, monitoring means can be provided for each flow channel of the microfluidic sample carrier, which monitoring means is for monitoring a filling of the respective flow channel. For example, such monitoring means can be provided separately from the microfluidic sample carrier, e.g. arranged on a sensor circuit board or the like, which can be placed adjacent to the microfluidic sample carrier's flow channels. In further detail, the microfluidic sample carrier can be arranged on the separate sensor circuit board and can even be actively pressed thereon during filling. Thereby, the monitoring means located on the sensor circuit board can register capacitance changes when, for example, a microfluidic sample carrier is inserted into the microfluidic sample carrier sealing system of the present disclosure, or in case a microfluidic sample carrier already filled with master mix or the like is inserted, or in case the microfluidic sample carrier is finally filled with the sealing liquid. Here, the monitoring means can include at least one capacitive sensor formed by two electrodes provided in contact with an underside of the microfluidic sample carrier at the respective flow channel to be monitored. Thereby, process monitoring can be performed by means of the capacitive sensor located below the consumable and directly contacting its underside, resulting in that a reaction path of the microfluidic sample carrier in the form of the flow channel can be subdivided into segments by the capacitive sensor. For example, several electrodes can be arranged under each flow channel of the microfluidic sample carrier, with a pair of two opposing electrodes providing one capacitive sensor, and with each capacitive sensor dividing the flow channel into two segments. Based thereon, one capacitive sensor can divide the flow channel into two segments, two capacitive sensors divide the flow channel into three segments, three capacitive sensors divide the flow channel into four segments, and so on.

In case an electric field is generated between the two electrodes as described above, any liquid flowing within the sample carrier acts as a dielectric and changes the capacitance of each capacitive sensor, which can be measured. By means of e.g. four individual capacitive sensors per reaction path, the filling level and the filling process can be monitored by four different thresholds in the form of the four individual capacitive sensors provided along the flow channel. Thus, in order to guarantee the filling not only indirectly via the parameterization of all actuators involved, but also directly, process monitoring as previously described is used. With such structural features, it becomes possible to record different filling levels before and during a filling process of the microfluidic sample carrier, and to reach different conclusions therefrom:

Sample is present in the microfluidic sample carrier: In case, sample is provided with the microfluidic sample carrier, at least one capacitive sensor should deviate from its original state in regard to capacitance. If no capacitive sensor deviates from its original state in regard to capacitance, it can be derived that no sample is present in the sample carrier. Thus, the microfluidic sample carrier does not have to be sealed, since the sealing liquid to be dispensed serves only as a seal for sample within the microfluidic sample carrier. In such case, the used microfluidic sample carrier can be identified as empty or "faulty filling";

Filling speed/volume flow can be determined: The presence of a flow front during filing with sample liquid and/or filing with sealing liquid can be detected via several measuring points provided by a plurality of capacitive sensors arranged along each flow channel. With the determined time values, a filing speed/volume flow in the monitored flow channel of the microfluidic sample carrier can be calculated; or End of the reaction distance is reached: The last detection segment, i.e. the last capacitive sensor provided downstream at the monitored flow channel can be used to determine whether any liquid has reached the end of the reaction path. In addition to being able to determine a time parameter that specifies the end of the filling process, the filling with liquid can be terminated directly by means of the sensor signal of the last capacitive sensor.

The above listing of possible conclusions is not to be understood as complete but only gives several possibilities of conclusions. Of course, based on the measurement results, other possible conclusions can also be drawn within the scope of the present disclosure.

According to a further aspect of the present disclosure, a method of dispensing sealing liquid into a prefilled microfluidic sample carrier with a dispensing system as previously described is provided. In further detail, and in particular in regard to the use of Mirasil™ DM50 as sealing fluid, the inventive method includes the steps of (a) opening the first valve of the previously described dispensing system;
(b) flushing the supply channel with sealing liquid by pumping sealing liquid into the supply channel, wherein excessive sealing liquid potentially including air bubbles can be discharged through the open first valve;
(c) closing the first valve, thereby generating a closed hydraulic sealing liquid column within the supply channel;
(d) opening the second valves individually and successively for connecting each injection channel with the supply channel and flushing each injector with sealing liquid;
(e) pumping further sealing liquid into the supply channel, wherein excessive sealing liquid potentially including air bubbles can be discharged through the respective injector, wherein an empty microfluidic sample carrier can be used to catch the excessive sealing liquid, which microfluidic sample carrier can then be disposed of, and closing the second valves;
(f) arranging a microfluidic sample carrier comprising an filling area, an outlet, and at least one flow channel, the filling area being prefilled with sample liquid, the prefilled microfluidic sample carrier to be filled with sealing liquid, at the dispensing system, wherein each injection unit is aligned with each flow channel;
(g) opening the second valves again and pumping a preset volume of sealing liquid, for example between 90 μl and 120 μl, such as 105 μl, through the supply channel into the filling area of the microfluidic sample carrier, wherein a time delay between opening the second valves and dispensing the liquid into the filling area of the microfluidic sample carrier can be about 0 s or exactly 0 s, with a preferred dispensing speed of between 180 μl/s and 220 μl/s, such as 200 μl/s;
(h) closing each second valve immediately after the volume delivery for achieving a constant drop break-off at the outlet opening of each injector, which closing should be done immediately or almost immediately after the volume delivery by the liquid pump so that a drop break-off is constant and no dripping occurs, resulting in a time delay between a dispensing action and the closing of each second valve of about 0 ms or exactly 0 ms;
(i) drawing sealing liquid from the supply channel by the liquid pump, also referred to as resoaking, and opening the first valve, for overpressure compensation, wherein, due to the fast closing of second valves, a slight overpressure can be generated within the system, which overpressure can be compensated by the liquid pump drawing a small amount of liquid back into the system in the opposite direction, and by opening the first valve for a short amount of time afterwards for additional overpressure compensation, and wherein a time delay between closing of each second valve and resoaking can be between 40 ms and 60 ms, such as 50 ms, a volume to be resoaked can be between 2 μl and 5 μl, such as 3 μl, a pump speed used for resoaking can be between 20 μl/s and 40 μl/s, such as 30 μl/s, and a time delay between an end of the resoaking process and an opening of the first valve can be about 0 ms or exactly 0 ms;
(j) closing the first valve, wherein a time delay between an opening and closing of the first valve can be between 900 ms and 1100 ms, such as 1000 ms;
(k) opening the second valves individually and successively for connecting each injection channel with the supply channel; and
(l) drawing further sealing liquid from the supply channel by the liquid pump for removing potential residue sealing liquid at the outlet opening of the injector, meaning that the second valve upstream of each injector is opened again in the previous step so that no droplet remains on the injector's outlet opening, which droplet could have been caused by a previous drop break-off, and such that liquid can be drawn back into the system by the liquid pump in a direction opposite to the dispensing direction, wherein a time delay between the opening of the second valve and a respective resoak can be about 0 ms or exactly 0 ms, a liquid volume to be resoaked can be between 3 μl and 8 μl, such as 5 μl, and a pump speed used for resoaking can be between 20 μl/s and 40 μl/s, such as 30 μl/s.

Afterwards, i.e., after the above described method steps, each second valve provided upstream of a respective injector can be closed again, wherein a delay after step (l) and before closing can be between 900 ms and 1100 ms, such as 1000 ms. Further, in order to return the liquid pump to its initial position, the changeover valve on the liquid pump can be switched to its suction side, i.e. opposite to its dispensing side, and the liquid pump is moved to its zero point, whereby residual liquid is returned to the liquid reservoir. Then, the changeover valve of the liquid pump can be switched back to the delivery/dispensing side. Moreover, at the very initial stage, i.e. before step (a) above, the liquid pump can already be filled with liquid, i.e. the liquid pump picks up the liquid from the liquid reservoir, advantageously at low speed in order to prevent outgassing. This can be achieved by the liquid pump switching its changeover valve to an intake side and sucking desired liquid volume in. Then, the changeover valve of the pump is switched back to the delivery or dispensing side, i.e. in a pumping direction towards the conduit member and, eventually, towards the injectors. For this purpose, an aspiration speed of about 40 µl/s and a time delay between aspiration and opening of the switching valve of about 2050 ms is advantageous, which time delay gives the oil column in the line time to reduce any resulting forces caused by the aspiration. With the thus carried-out dispensing method, the sealing liquid is successfully, bubble-free and without any residue at each injector's outlet opening dispensed into the filling area of a respective microfluidic sample carrier. Based thereon, it can be particularly gathered how injector geometry and suitable parameterization can be used to ensure that the liquid is discharged without any misalignment of volume.

The above described method can be divided into different phases, i.e. the steps (a) to (e) of opening the first valve, flushing the supply channel with sealing liquid, closing the first valve, opening the second valves individually and successively, pumping further sealing liquid into the supply channel and closing the second valves again can constitute an initial priming phase or priming procedure of the dispensing system, wherein the remaining steps (f) to (l) can constitute a filling phase or filling procedure of filling sealing liquid into a respective microfluidic sample carrier, wherein, during the filing phase, the filling of each flow channel can be monitored by the respective monitoring means as described further above. Also, the filling phase, i.e. above described steps (f) to (l), can be repeated for each subsequent prefilled microfluidic sample carrier, whereas is sufficient to carry out the initial priming phase of steps (a) to (e) merely once before starting a batch of microfluidic sample carriers to be sealed, for example when turning on the dispensing system, or in certain time intervals such as once or twice a day or after a certain number of sealed microfluidic sample carriers, after the microfluidic sample carrier sealing system has not been used for a while, i.e. in general at certain times when priming is necessary to flush the system in order to make sure that the system is clean.

In the course of an embodiment of the method of the present disclosure as described above, and in addition to the above described method steps, an optional additional method step can be carried out, i.e. overpressure of air can be applied by an air supply unit of the dispensing system above the filling area of the microfluidic sample carrier, thereby distributing the sealing liquid dispensed into the filling area through each flow channel of the microfluidic sample carrier, for example with a constant distribution flow speed. In doing so, the sample liquid previously filled into the filling area of the microfluidic sample carrier before the sealing liquid has been dispensed into the filling area of the microfluidic sample carrier is pushed through each flow channel of the microfluidic sample carrier by means of the sealing liquid, driven with the constant distribution flow speed provided by the overpressurized air. Thus, the applied air pushes the sealing liquid dispensed into the filling area of the microfluidic sample carrier into and through each flow channel of the microfluidic sample carrier, and, in turn, the sealing liquid pushes the sample liquid through each flow channel of the microfluidic sample carrier, thereby filling each microwell in the microfluidic sample carrier with sample and, subsequently, sealing each microwell in the microfluidic sample carrier filled with sample with sealing liquid.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this application, shall refer to this application as a whole and not to any particular portions of the application. Also, the term "about" as used herein means a quantity that is approximately, nearly, or nearly equal to or less than about 5%, about 4%, about 3%, about 2%, or about 1%. It is used to denote the amount of the same or equivalent amount in its vicinity.

Furthermore, certain terms are used for reasons of convenience and are not intended to limit the disclosure. The terms "right", "left", "up", "down", "under" and "above" refer to directions in the Figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the Figures. These spatially relative terms are intended to encompass different positions and orientations of the devices in use or operation in addition to the position and orientation shown in the Figures. For example, if a device in the Figures is turned over, elements described as "below" or "beneath" other elements or features would then be "above" or "over" the other elements or features. Thus, the exemplary term "below" can encompass both positions and orientations of above and below. The devices may be otherwise oriented (rotated 90° or at other orientations), and the spatially relative descriptors used herein interpreted accordingly. Likewise, descriptions of movement along and around various axes include various special device positions and orientations.

To avoid repetition in the Figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or Figure does not imply that the aspect is missing from embodiments that incorporate that aspect. Instead, the aspect may have been omitted for clarity and to avoid prolix description. In this context, the following applies to the rest of this description: If, in order to clarify the drawings, a Figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more Figures represent the same or similar elements.

The following examples are intended to illustrate various specific embodiments of the present disclosure. As such, the specific modifications as discussed hereinafter are not to be construed as limitations on the scope of the present disclosure. It will be apparent to the person skilled in the art that various equivalents, changes, and modifications may be made without departing from the scope of the present disclosure, and it is thus to be understood that such equivalent embodiments are to be included herein. Further aspects and advantages of the present disclosure will become apparent from the following description of particular embodiments illustrated in the Figures.

Reference(s) to "embodiment(s)" throughout the description which are not under the scope of the appended claims merely represent possible exemplary executions and are therefore not part of the present disclosure.

An embodiment of a dispensing system 1 according to the present disclosure is shown in FIG. 1 in a partially cut perspective view, wherein the structure of the dispensing system 1 is depicted in an exploded manner in order to be able to describe the structural relationship between these components in an improved manner. Also, in FIG. 1, a microfluidic sample carrier 9 is illustrated next to the dispensing system 1, in particular in a position below the dispensing system 1, wherein a filling of the microfluidic sample carrier 9 by the dispensing system 1 can only take place when the microfluidic sample carrier 9 is positioned below the dispensing system 1. Here, the combination of the dispensing system 1 and the microfluidic sample carrier 9 constitute a microfluidic sample carrier sealing system in accordance with the present disclosure. For the sake of improved illustration of the main components of the dispensing system 1, some components of the dispensing system 1 are omitted in FIG. 1, such as the liquid reservoir or the liquid pump connected thereto, in order to be able to focus on the core idea of the present disclosure. However, it is to be noted that—in the presently described embodiment—the liquid reservoir is a sealing liquid reservoir and, accordingly, the liquid pump is a sealing liquid pump, resulting in that the dispensing system 1 of the presently described embodiment is for dispensing sealing liquid, wherein the sealing liquid pump comprises a controllable volume displacement actuator in the form of a stepper motor and a changeover valve in the form of an electromagnetic valve.

Figure 4:
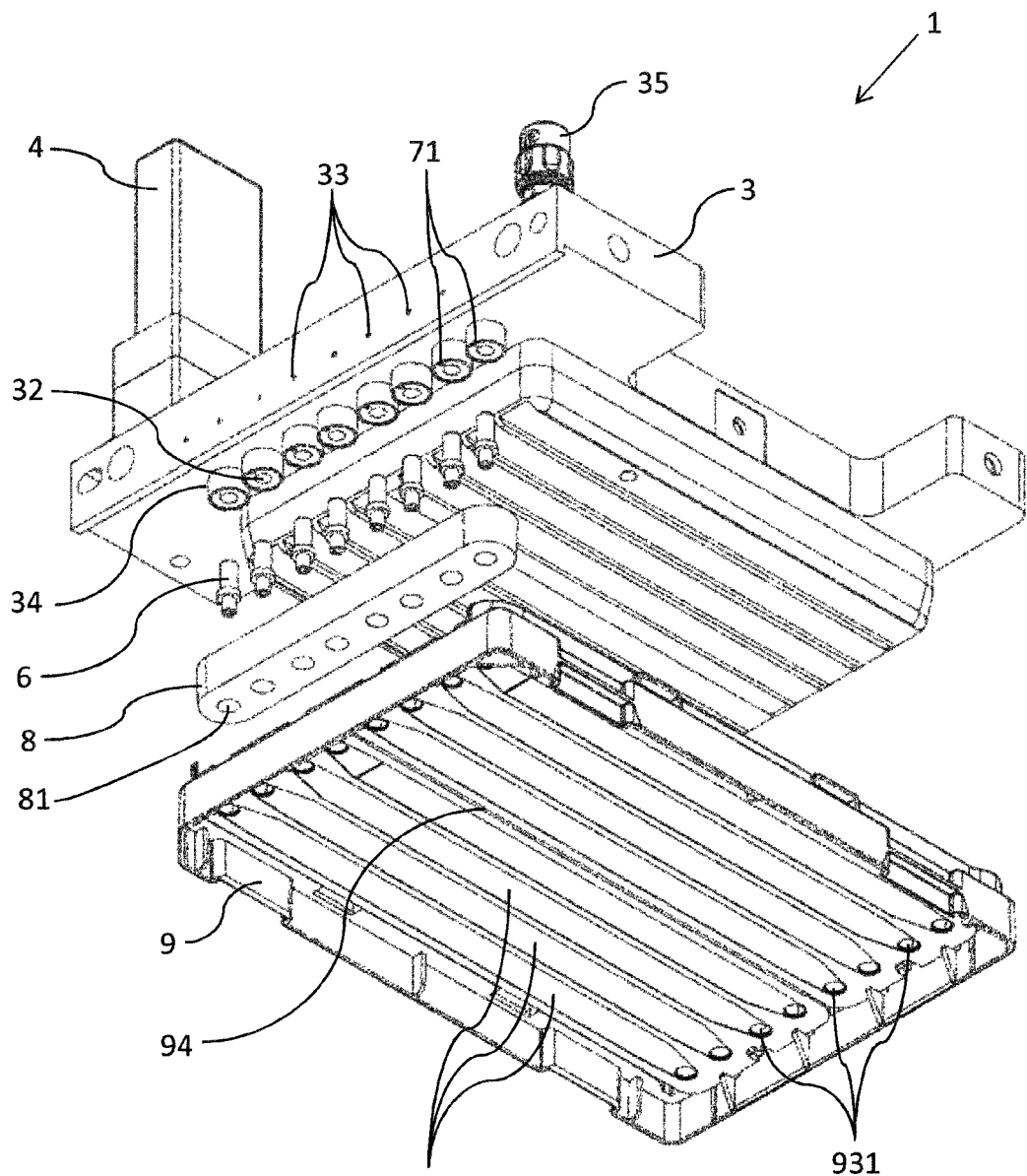
FIG. 4 is a conceptual perspective view of a microfluidic sample carrier sealing system according to an embodiment of the present disclosure in an exploded manner viewed from below, including a dispensing system as depicted in FIGS. 1 and 2.
Figure 5:
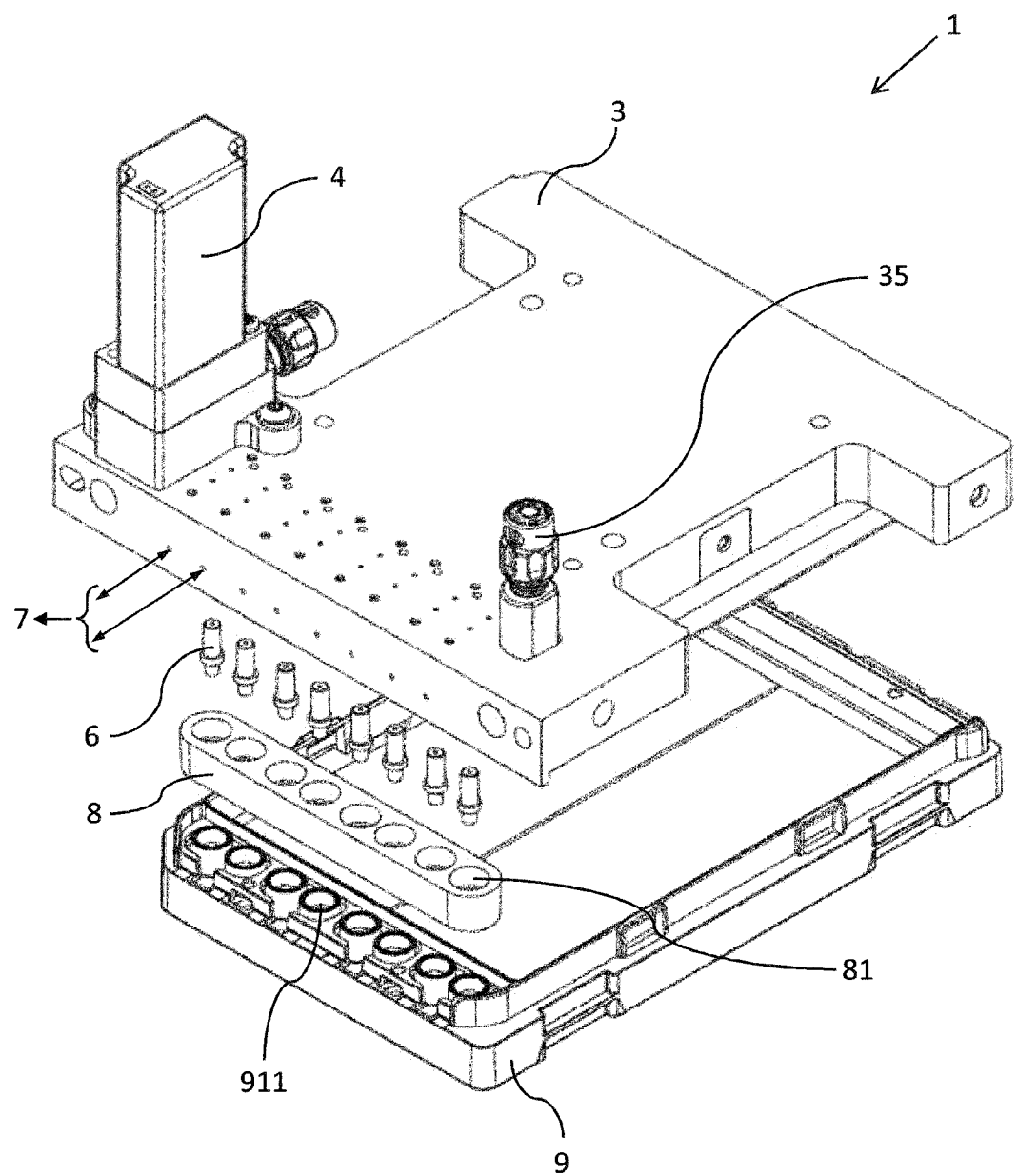
FIG. 5 is a conceptual perspective view of a microfluidic sample carrier sealing system as depicted in FIG. 4 in an exploded manner viewed from above, including a dispensing system.

As illustrated in FIG. 1, and as can also be gathered from e.g. FIGS. 4 and 5, the dispensing system 1 comprises a conduit member 3 in the form of a plate or board, including a common supply channel 31 as well as several line systems in the form of fluid distribution systems, such as liquid distribution channels 32 connected to the supply channel 31, thereby rendering the supply channel 31 to be a "common" supply channel 31, or gas distribution channels 33 extending through the conduit member 3 independently from the supply channel 31 or the liquid distribution channels 32. Liquid can be supplied by means of a liquid pump (not shown), such as from a liquid reservoir (not shown) through the liquid pump (not shown) to a liquid connector 35 of the conduit member 3 to the supply channel 31 and further through the liquid distribution channels 32, wherein the liquid connector 35 serves as connection hub for the liquid pump. In order to be able to introduce liquid into the supply channel 31, a first vale or prime valve 4 is connected to one end of the supply channel 31 opposite to the end of the supply channel 31 associated with the liquid connector 35. Here, in order to properly introduce the liquid into the supply channel 31, the first valve 4 can be opened, so that air or the like prevailing within the supply channel 31 at first can be removed from the supply channel 31 by means of pumping liquid into the supply channel 31, thereby making it possible to achieve a closed column of liquid within the supply channel 31 after closing the first valve 4 again. Thus, potential air cushions within the supply channel 31 can be flushed out of the conduit member 3.

Further, gas can be supplied from an air supply unit 7 (merely insinuated in FIG. 5) comprising features such as a pressurized-air reservoir and an air pressure regulator or the like, through the gas distribution channels 33 of the conduit member 3, see also the arrows in FIG. 5 directed towards the air supply unit 7. Moreover, the dispensing system 1 comprises one or more injectors 6 made of a plastic material exhibiting low surface energy, such as PTFE, which injectors 6 are described in further detail in connection with FIG. 3 below, and an elongated sealing member 8 with partly tapered inner bores 81 provided therein, with one inner bore 81 provided for each injector 6. Here, as can also be gathered from FIG. 2, the inner bore 81 of the sealing member 8 comprises an inner rim 82 provided on the inside of the inner bore 81, as engagement edge for engagement with a port 34 of the conduit member 3. The inner bore 81 basically consists of two sections, an upstream section with a constant inner diameter for accommodating the port 34 therein, and a downstream section adjacent to the upstream section, which downstream section is tapered from the edge of the inner rim 82 towards an end face of the sealing member 8 directed away from the conduit member 3. Here, the liquid distribution channel 32 guiding from the supply channel 31 to the port 34, the gas distribution channel 33 guiding air to an air outlet nozzle 71 within the port 34, the port 34 itself including the air outlet nozzle 71, and the injector 6 altogether constitute an interface unit 2 of the dispensing system 1, which interface unit 2 is provided for each one of liquid inlets 911 of a filling area 91 of the microfluidic sample carrier 9, i.e. for each one of flow channels 92 of the microfluidic sample carrier 9. Accordingly, any liquid to be dispensed by the dispensing system 1 is provided to each flow channel 92 of the microfluidic sample carrier 9 by means of the respective interface unit 2.

Based on the above, the conduit member 3 connects the liquid reservoir (not shown) via the liquid pump (not shown), the liquid pump connector 35, and through the supply channel 31 to each interface unit 2. Here, in order to provided any liquid within the supply channel 31 to each interface unit 2, a second valve or switching valve 5 is provided for each interface unit 2 within the liquid distribution channel 32 leading from the supply channel 31 to the injector 6. Thereby, a connection between the supply channel 31 and each injector 6 can be switched open and close on demand. Here, during priming, the plurality of second valves 5 (only one second valve is shown in FIG. 1 for the sake of better overview) can be opened individually and serially, in order to flush the liquid distribution channels 32 with liquid from the supply channel 31 one after the other, thereby flushing any gas cushions or the like out of the liquid distribution channels 32 through the respective injector 6 and, together with a certain residue volume of liquid, into a movable collection pan (not shown) from which the flushed-out and collected liquid can be pumped or guided into a waste container or the like.

In order to be able to achieve a precise delivery of small volumes by means of the dispensing system 1, such as volumes of about ≤200 µl, and in order to establish a clear drop break-off behavior, each injector 6 provides a certain design: As can be gathered from FIG. 3, each injector 6 comprises a main body 61 and an injection channel 62 provided along a longitudinal axis of the main body 61 in the form of a through hole through the injector 6 from a first end surface or inlet end surface 611 of the injector's main body 61 to a second end surface or outlet end surface 612. Here, the first end surface 611, in combination with the outer circumference of the injector 6, serves as alignment means with the port 34 of the conduit member 3 in order to position the injector 6 within the port 34. Further, described from top to bottom in FIG. 3, the through hole of the injection channel 62 of the injector 6 provides for a first part or inlet part 621 for receiving liquid from the supply channel 31 and a middle part 622 for guiding liquid away from the inlet part 621 towards an outlet part 623 for dispensing liquid into a sample carrier liquid inlet 911, wherein the outlet part 623 of the injection channel 62 ends in an outlet opening 63 of the injector 6, from which outlet opening 63 the droplets of liquid are to be dispensed.

In regard to the dimensions of the different parts of the injection channel 62, each part of the injection channel 62 provides a different inner diameter ø. In the case of the presently described embodiment, the inner diameters ø of the injection channel 62 are designed such that a cross section $ø_{out}$ of the outlet part 623 of the injection channel 62 is larger than a cross section $ø_{in}$ of the inlet part 621 of the injection channel 62 and larger than a cross section $ø_{mid}$ of the middle part 622 of the injection channel 62. Additionally with the presently described embodiment, the cross section $ø_{in}$ of the inlet part 621 of the injection channel 62 is larger than the cross section $ø_{mid}$ of the middle part 622 of the injection channel 62, which is an optional feature, since the cross section $ø_{in}$ of the inlet part 621 of the injection channel 62 can also be sized similarly or identically to the cross section $ø_{mid}$ of the middle part 622 of the injection channel 62. Here, in the present embodiment, the cross section $ø_{in}$ of the inlet part 621 is about 0.8 mm, the cross section $ø_{mid}$ of the middle part 622 is about 0.5 mm, and the cross section $ø_{out}$ of the outlet part 623 is about 1.2 mm. Thereby, the conditions (a) $ø_{out} > ø_{in}$, (b) $ø_{out} > ø_{mid}$ and also (c) $ø_{out} > ø_{in} > ø_{mid}$ are met, since $ø_{out} = 1.2$ mm $> ø_{in} = 0.8$ mm $> ø_{mid} = 0.5$ mm.

In regard to further dimensioning of the injector 6, in particular in regard to an axial length of each part of the injection channel 62, a length $l_{mid}$ of the middle part 622 of the injection channel 62 is larger than a length $l_{out}$ of the outlet part 623, wherein the length $l_{mid}$ of the middle part 622 of the injection channel 62 can optionally be equal to the length $l_{out}$ of the outlet part 623. Furthermore, in the presently described embodiment, a length $l_{in}$ of the inlet part 621 of the injection channel 62 is larger than or equal to the length $l_{mid}$ of the middle part 622, in which case the length $l_{out}$ of the outlet part 623 is shorter than the length $l_{mid}$ of the middle part 622 or the length $l_{in}$ of the inlet part 621 of the injection channel 62. In particular, in the presently described embodiment, the $l_{out}$ of the outlet part 623 of the injection channel 6 can be about or larger than 2 mm. Here, in the present embodiment, the length $l_{in}$ of the inlet part 621 is about 4 mm, such as 4.12 mm, the length $l_{mid}$ of the middle part 622 is about 4 mm, such as 4.08 mm, and the length $l_{out}$ of the outlet part 623 is about 2 mm, resulting in an overall length of the main body 61 of the injector 6 and, thus, the overall length of the injection channel 62 of about 10.2 mm, wherein the conditions (d) $l_{mid} \geq l_{out}$, (e) $l_{in} \geq l_{mid} > l_{out}$, and (f) $l_{out} \geq 2$ mm are met, since $l_{in} = 4.12$ mm $l_{mid} = 4.08$ mm $> l_{out} = 2$ mm.

Moreover, in regard to dimensioning of the outlet part 623 of the main body 61 in regard to its outer circumference vis-à-vis the inner diameter of the outlet part 623 of the main body 61, i.e. vis-à-vis the cross section $ø_{out}$, the second end surface 612 of the main body 61 of the injector 6 at the outlet opening 63 is kept to a minimum based on production-related feasibility, in order to reduce contact surface for the sealing liquid to be dispensed from the outlet opening 63 and, thus, improve drop break-off significantly. In this regard, as can be gathered from FIG. 3, the outer diameter of the injector 6 at the outlet part 623 is smaller than the outer diameter of the injector 6 at the inlet part 621 and parts of the middle part 622, wherein a certain thickness of the injector material around the outlet part 623 of the injection channel 62 must be provided, already in regard to manufacturing requirements. For example, when drilling a hole into the main body 61 of the injector 6 in order to introduce the injection channel 62 into the injector 6, a certain outer wall thickness around the injection channel 62 is required, and also must remain in order to maintain a certain durability of the injector 6. In regard to introducing the injection channel 62 into the injector 6, drilling a hole into the main body 61 is only one of several possibilities of how to manufacture the injector 6.

Further, when introducing the injection channel 62 into the main body 61 of the injector 6, an inner circumference of the downstream end of the outlet part 623 of the injection channel 62 comprises an outlet chamfer 624 enlarging its cross section $ø_{out}$ at the downstream end of the injection channel 62, which outlet chamfer 624 in the presently described embodiment exhibits an angle of 45°. Here, the outlet chamfer 624 again contributes to the reduction of the wall thickness around the downstream end of the injection channel 62 and, thus, results in improved drop break-off. Furthermore, in the present embodiment, in which the injection channel 62 is drilled into the main body 61 of the injector 6, a passage chamfer 625 is provided between the inner circumference of the inlet part 621 and the inner circumference of the middle part 622, which passage chamfer 625 exhibits an angle of about 28°. However, the passage chamfer 625 has a different purpose, i.e. to improve the passage of sealing liquid from the inlet part 621 to the middle part 622 of the injection channel 62. Contrary thereto, no further chamfer is provided between the middle part 622 and the outlet part 623 of the injection channel 62, such that a passage between the middle part 622 and the outlet part 623 of the injection channel 62 for the sealing fluid is a clear rectangular step, resulting in that an expansion of the flow of liquid through the injection channel 62 is achieved at this point and flow pressure is suddenly reduced as the liquid expands, which results in an improved controllability of drop break-off at the outlet opening 63 and prevents uncontrolled exit of liquid from the injector 6. Finally, when further observing the outer circumference of the main body 61 of the injector 6, it can clearly be derived from each one of FIGS. 1 to 5 and in particular from the enlarged illustration in FIG. 2 that a shoulder 613 protrudes from the main body 61 of the injector 6, which shoulder functions as collar for engagement with a tool for pressing the injector 6 within the port 34.

Figure 2:
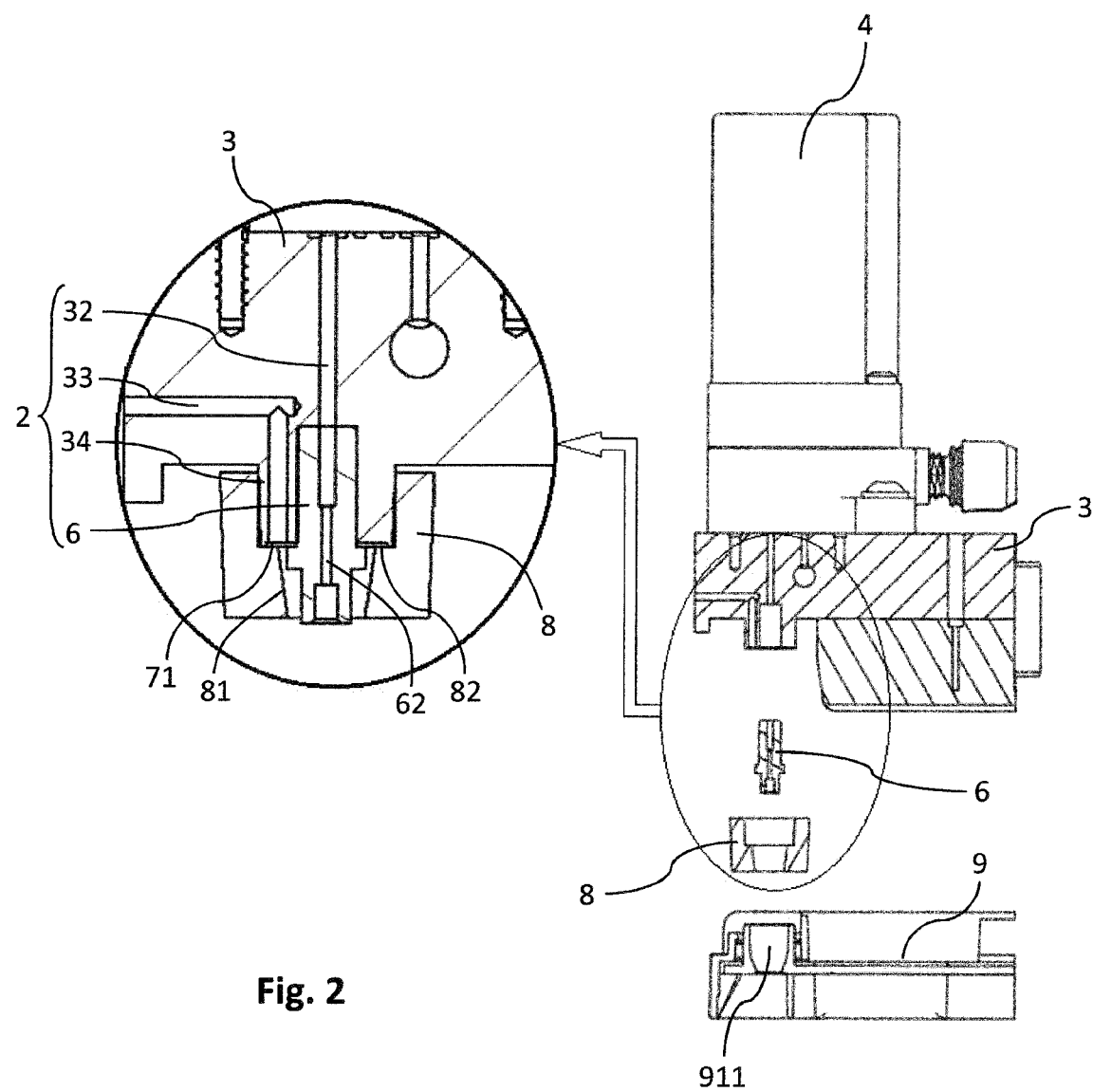
FIG. 2 is a partially cut conceptual side view of a dispensing system as depicted in FIG. 1 in an exploded manner, with a microfluidic sample carrier arranged below, and including an enlarged sectional view of an interface unit according to the present disclosure.
Figure 3:
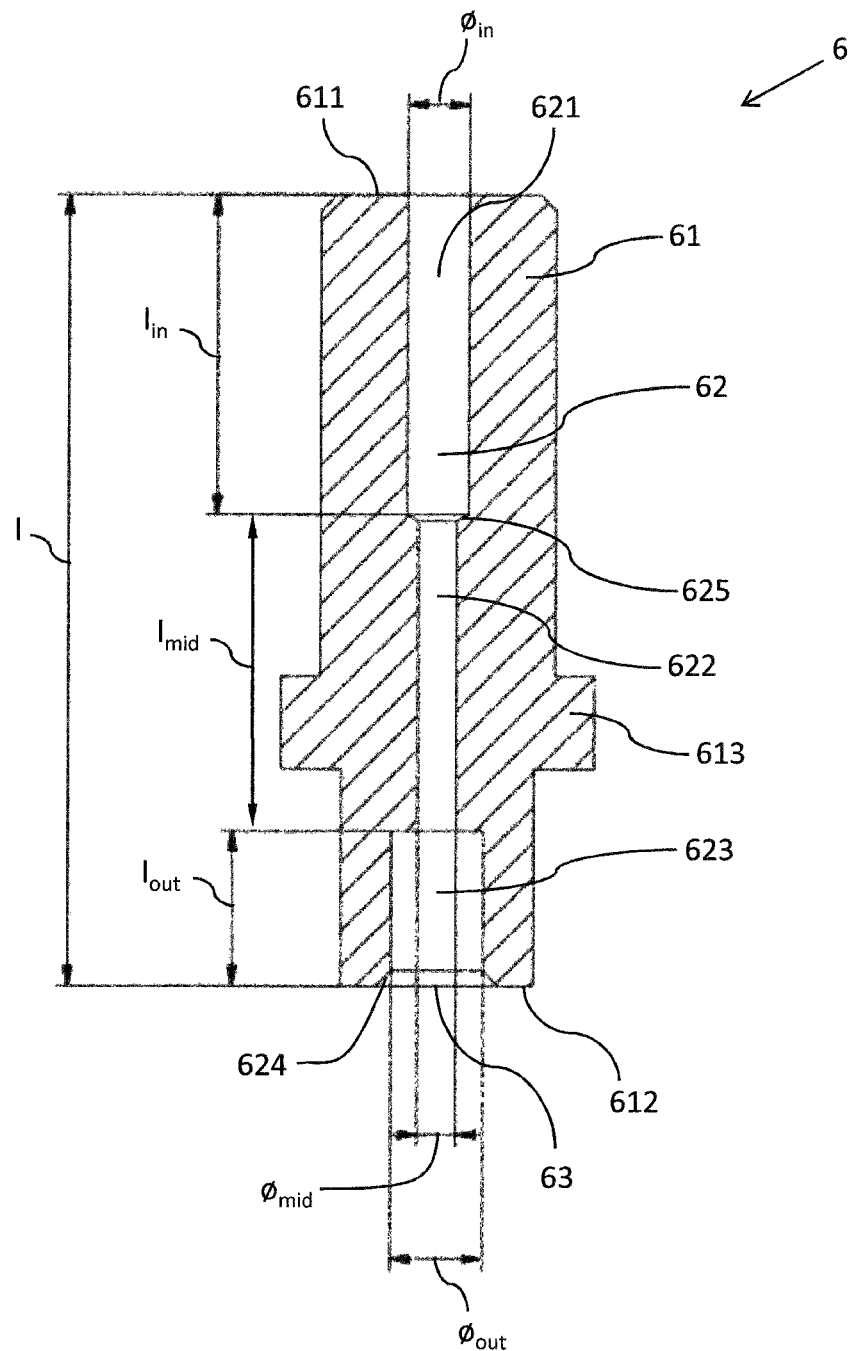
FIG. 3 is an enlarged sectional side view of an injector of the dispensing system as depicted in FIGS. 1 and 2 in an exploded manner.

From FIGS. 1 and 2, and in particular from the enlarged view in FIG. 2, an exemplary interface unit 2 can be gathered, constituted by the liquid distribution channel 32, the gas distribution channel 33, the port 34 including the air outlet nozzle 71, and the injector 6. Here, it can also be gathered that each interface unit 2 is surrounded by the sealing member 8. In further detail, it can be gathered that the sealing member 8 comprises inner bores 81 provided therein, with one inner bore 81 provided for each injector 6. Here, as can also be gathered from the enlarged view in FIG. 2, and already described in part above, the upstream section of the inner bore 81 encompasses the outer diameter of the port 34, and the inner rim 82 of the sealing member 8 abuts the end surface of the port 34 in a way such that the air outlet nozzle 71 maintains open, at least in part. In order to position the air outlet nozzle 71 at the end surface of the port 34, the gas guiding channel 33 extends through the conduit member 3 and through the port 34 to its end surface directed away from the conduit member 3. Also, the air outlet nozzle 71 is positioned at the end surface of the port 34 such that the shoulder 613 of the injector 6 when being placed within the port 34 does not cover the air outlet nozzle 71. Thus, in an assembled state, the air outlet nozzle 71 is arranged between the sealing member 8 and the injector 6, with the inner rim 82 of the sealing member 8 and the shoulder 613 of the injector 6 maintaining sufficient space therebetween in order to allow air to sufficiently exit the air outlet nozzle 71 towards the sample carrier 9. With this arrangement, air tight seal between the port 34 and the sealing member 8 can be ensured, resulting in that air discharged from the air outlet nozzle 71 can not exit between the port 34 and the sealing member 8, which ensures a sufficient pressure build-up by the air outlet nozzle 71 in regard to the generation of overpressure above the filling area 91 of the sample carrier 9, in order to guide the liquid volume through the flow channels 92 of the sample carrier 9.

Additionally, as can also be gathered in particular from the enlarged view in FIG. 2, the shoulder 613 of the injector 6 as well as its remaining downstream part including the outlet part 623 of the injection channel 62 is arranged within the tapered downstream section of the inner bore 81 of the sealing member 8 in a way such that the second end surface 612 or outlet end surface 612 of the injector 6 is positioned slightly outside of the sealing member 8, i.e. protruding therefrom. Accordingly, in regard to a lengthwise extension of the injector 6 within the sealing member 8, the air outlet nozzle 71 of the depicted interface unit 2 is arranged within the respective inner bore 81 of the elongated sealing member 8, whereas the downstream end of the injector 6 including the second end surface 612 of the main body 61 of the injector 6 and the outlet opening 63 is arranged outside of the sealing member 8, i.e. protrudes from the sealing member 8 to the outside, towards the microfluidic sample carrier 9. Thus, when contacting the filling area 91 of the sample carrier 9 with the dispensing system 1, the interface units 2 are pressed against the filling area 91 of the sample carrier 9 such that an end surface of the sealing member 8 directed away from the conduit member 3 is pressed against the upper surface of the sample carrier liquid inlets 911 of the filling area 91 of the sample carrier 9. In doing so, an air-tight connection between the inner space of each inner bore 81 of the sealing member 8 with an inner space of the respective liquid inlet 911 of the filling area 91 is produced, in order to be able to apply overpressure to the filling area 91 of the sample carrier 9 by means of the air supply unit 7 and the respective air outlet nozzle 71, in order to guide any liquid volume inside the filling area 91 of the sample carrier 9 through the respective flow channel 92 of the sample carrier 9. Also, in doing so, the downstream end of each injector 6 including the second end surface 612 of the main body 61 of the injector 6 and the outlet opening 63 protrudes from the sealing member 8 into the respective liquid inlet 911 of the sample carrier 9. Thus, any sealing liquid dispensed by the dispensing system 1 by means of each injector 6 can be transferred without any loss into the respective liquid inlet 911, wherein the improved drop break-off behavior of the interface unit 2 of the dispensing system 1 of the present disclosure results in the capability of a precise delivery of a volume of ≤200 μl.

A microfluidic sample carrier sealing system 10 of the present disclosure for filling a microfluidic sample carrier 9 with a preset small volume of sealing liquid ≤200 μl includes the previously described dispensing system 1 as well as a microfluidic sample carrier 9 itself and can be gathered from, for example, FIGS. 1, 2, 4 and 5. Here, as previously already described and particularly depicted in FIGS. 4 and 6, the microfluidic sample carrier 9 includes the filling area 91 with a plurality of liquid inlets 911, a plurality of flow channels 92 and an outlet area 93, wherein each flow channel connects one liquid inlet 911 with a respective liquid outlet 931 of the outlet area 93. Usually, when using the dispensing system 1 of the presently described embodiment, each liquid inlet 911 of the microfluidic sample carrier 9 is already filled with sample liquid, and the sealing liquid to be dispensed by the dispensing system 1 is to be delivered into each of the liquid inlets 911. Then, as described above, pressurized or compressed air can also be provided to each flow channel 92 of the microfluidic sample carrier 9 by means of the dispensing system 1 in a uniform manner, thereby pressing the sealing liquid constantly through the flow channel 92 of the microfluidic sample carrier 9, in order to achieve an even distribution of the liquid over the entire reaction path of the microfluidic sample carrier 9. In doing so, the applied air pushes the sealing liquid dispensed into the filling area 91 of the microfluidic sample carrier 9 into and through each flow channel 92 of the microfluidic sample carrier 9 towards the outlet area 93, and, in turn, the sealing liquid pushes the prefilled sample liquid through each flow channel 92, thereby filling each microwell (not shown) in the microfluidic sample carrier 9 with sample and, subsequently, sealing each sample-filled microwell with sealing liquid.

Figure 6:
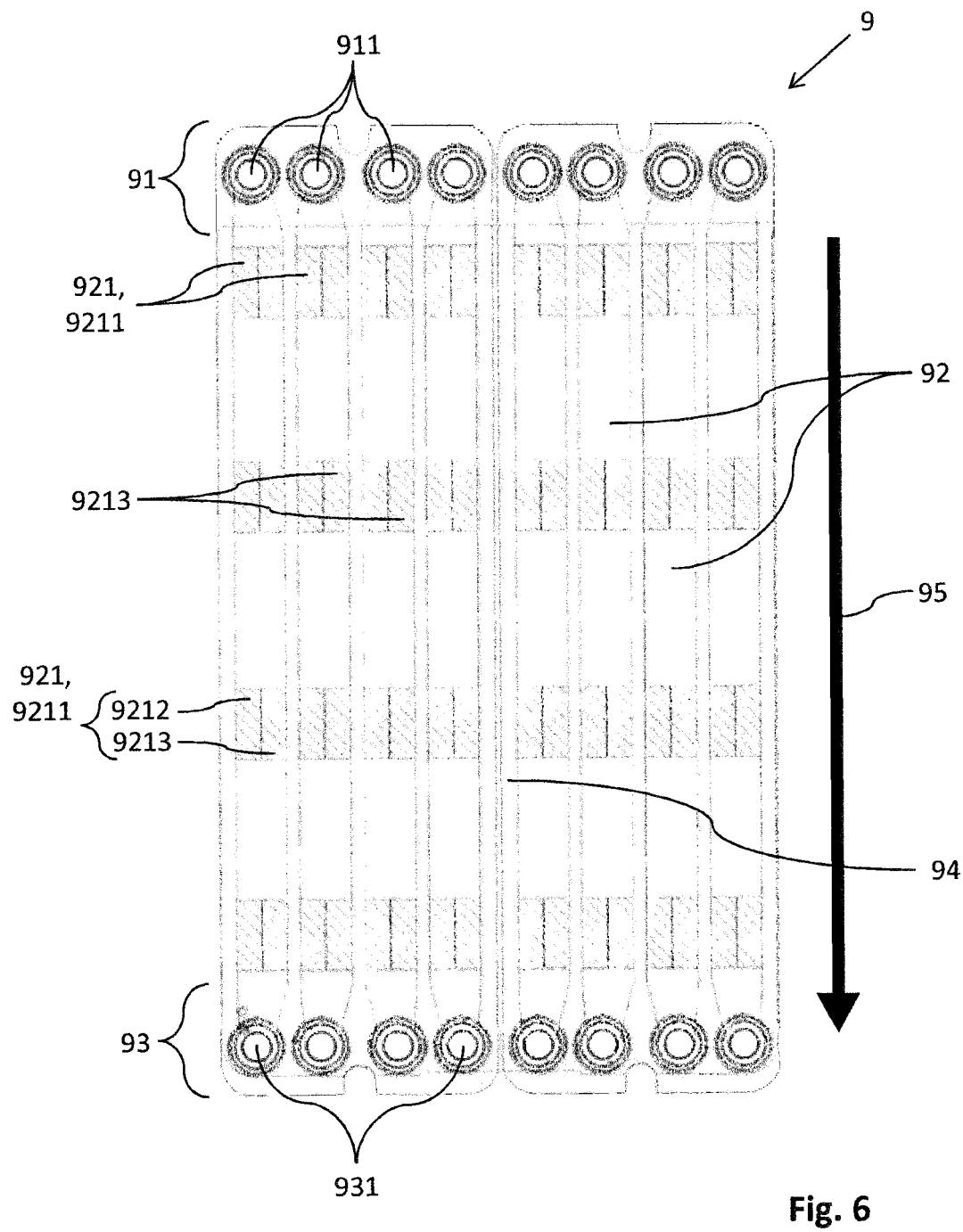
FIG. 6 is a conceptual plan view of the microfluidic sample carrier as depicted in FIGS. 1, 2, 4 and 5 from below.

In order to be able to monitor the progress of liquid movement along a flow direction 95 of liquid within each flow channel 92, the microfluidic sample carrier sealing system 10 of the present disclosure provides for a plurality of monitoring means 921 for monitoring a filling of the flow channels 92, see in particular FIG. 6. Here, the monitoring means 921 are provided separately from the microfluidic sample carrier 9, e.g. the monitoring means 921 are arranged on a (not shown) separate sensor circuit board or the like, which can be placed adjacent to the flow channels 92 to be monitored. In further detail, the microfluidic sample carrier 9 can be arranged on the (not shown) separate sensor circuit board and can even be actively pressed thereon during filling. Thereby, the monitoring means 921 located on the sensor circuit board can register capacitance changes when, for example, a microfluidic sample carrier 9 is inserted into the microfluidic sample carrier sealing system 10 of the present disclosure, or in case a microfluidic sample carrier 9 already filled with master mix or the like is inserted, or in case the microfluidic sample carrier 9 is finally filled with the sealing liquid. With such monitoring means 921, the filling level and the filling process can be monitored step-by-step. The monitoring means 921 are constituted by several capacitive sensors 9211 for each flow channel 92. In further detail in regard to the present embodiment, each capacitive sensor 9211 is formed by two electrodes 9212, 9213 generating an electric field in between them, wherein liquid passing the two electrodes 9212, 9213 acts as a dielectric and, thus, changes the capacitance of the respective capacitive sensor 9211, which changing of capacitance can be used as sensor signal detecting liquid passing by. In order to be able to most efficiently generate such detection signal, each electrode 9212, 9213 is provided in direct contact with an underside 94 of the microfluidic sample carrier 9 at the respective flow channel 92. In the embodiment as shown in FIG. 6, each flow channel 92 comprises four capacitive sensors 9211 arranged along its longitudinal extension, i.e. the capacitive sensors 9211 are distributed along the flow channel 92 from its liquid inlet 911 downstream to its liquid outlet 931, thereby dividing each flow channel 92 into several sections, in particular three sections.

Thereby, liquid entry can be detected by the first capacitive sensor 9211 arranged at the entrance of the flow channel 92 right after the liquid inlet 911. A filling of the first sector can be detected by the second capacitive sensor 9211 arranged downstream of the first capacitive sensor 9211. A filling of the second sector can be detected by the third capacitive sensor 9211 arranged downstream of the second capacitive sensor 9211. And finally, a filling of the third sector and, thus, the filling of the entire flow channel 92 can be detected by the fourth capacitive sensor 9211 arranged downstream of the third capacitive sensor 9211 and at the end of the flow channel 92. Of course, even more capacitive sensors 9211 can be arranged within each flow channel 92, in case a further detailed monitoring of each flow channel 92 with additional sectors is desired, whereas the minimum of capacitive sensors 9211 per each flow channel 92 to be monitored is two, one capacitive sensor 9211 arranged at the entrance of the respective flow channel 92 right after the liquid inlet 911 and the other one arranged at the end of the respective flow channel 92, in order to be able to detect liquid entry as well as the complete filling of the flow channel 92 step-by-step. Thereby, several conclusions can be reached by means of the sensor signals of the monitoring means 921, such as the information if liquid, i.e. sample or sealing liquid, is actually present in the microfluidic sample carrier 9, information about the filling speed of each flow channel 92, or also the information if the full reaction distance is reached, i.e. if the entire flow channel 92 has been filled with liquid.

Figure 7:
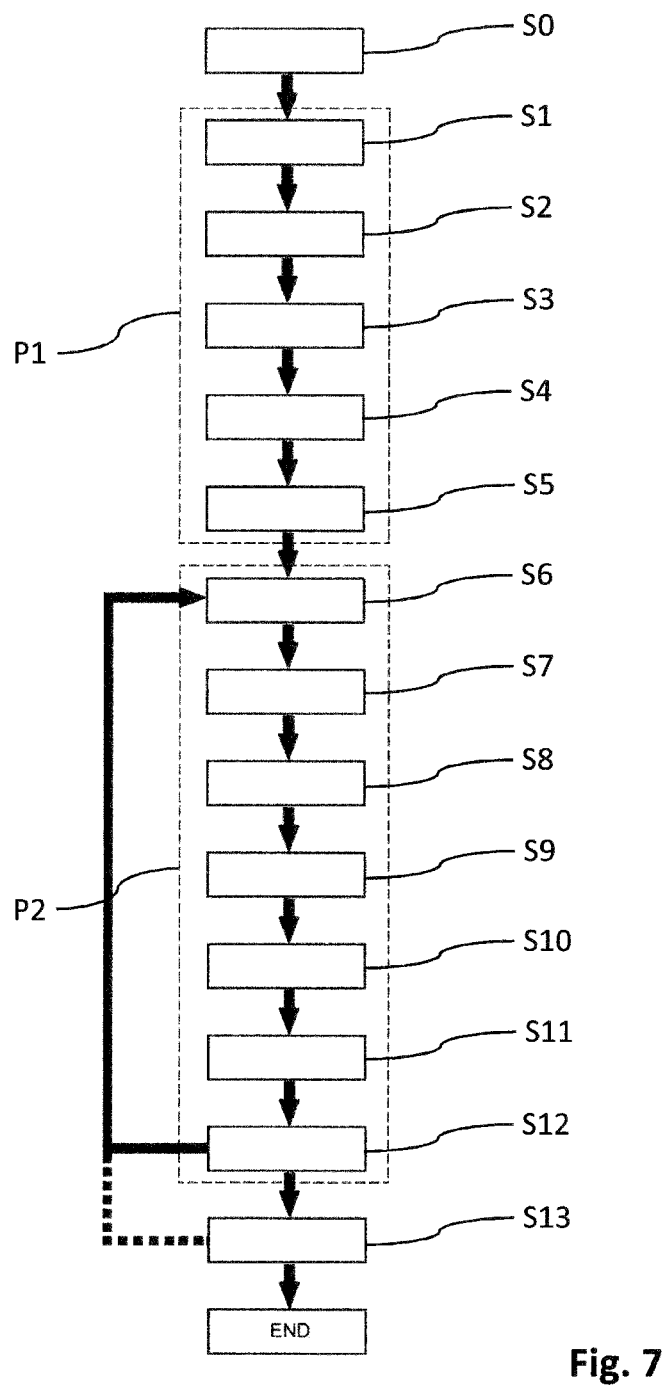
FIG. 7 is a flowchart illustrating an embodiment of a method of the present disclosure.

Based on the above described dispensing system 1, an embodiment of a method of dispensing sealing liquid into a prefilled microfluidic sample carrier 9 according to the present disclosure is depicted in FIG. 7. Therefrom, it can be gathered that such method comprises a plurality of method steps, wherein the method can be divided into a pre-phase and basically two main phases: a first main phase P1, also referred to as priming phase P1, in which the first valve 4 is opened, the supply channel 31 is flushed with sealing liquid, the first valve 4 is closed again, the second valves 5 are opened individually and successively, and further sealing liquid is pumped into the supply channel 31; and a second main phase P2 or filling phase P2 of filling sealing liquid into the respective microfluidic sample carrier 9, which filling phase P2 can be repeated for each microfluidic sample carrier 9, and wherein, during the filing phase P2, the filling of each flow channel 92 can be monitored by the respective monitoring means 921. In FIG. 7, the method steps of the main phases P1, P2, i.e. the method steps of the priming phase P1 and the filling phase P2 are arranged within a dashed-line box, respectively. Also, in FIG. 7, the possibility of repetition is depicted as return arrow, wherein the repetition can encompass the filling phase P2 alone or the filling phase together with step S13 as described further below.

In further detail, at the very initial stage, i.e. before any step of the two main phases is carried out, a pre-phase or pre-step S0 occurs, in which the liquid pump can already be filled with liquid, i.e. the liquid pump picks up the liquid from the liquid reservoir, advantageously at low speed in order to prevent outgassing. This can be achieved by the liquid pump switching its changeover valve to an intake side and sucking desired liquid volume in. Then, the changeover valve of the pump is switched back to the delivery or dispensing side, i.e. in a pumping direction towards the conduit member 3 and, eventually, towards the injectors 6. For this purpose, an aspiration speed of about 40 µl/s and a time delay between aspiration and opening of the switching valve of about 2050 ms is applied, which time delay gives the oil column time to reduce any resulting forces caused by the aspiration.

After the above described pre-step S0, and in the course of the main phases P1, P2 of the method of the presently described embodiment, the method comprises a step S1 of opening the first valve 4 of the dispensing system 1. Further, the method comprises a step S2 of flushing the supply channel 31 with sealing liquid by pumping sealing liquid into the supply channel 31 by means of the liquid pump, wherein excessive sealing liquid potentially including air bubbles can be discharged through the open first valve 4. Moreover, the method comprises a step S3 of closing the first valve 4, thereby generating a closed hydraulic column of sealing liquid within the supply channel 31. Further, the method comprises a step S4 of opening the second valves 5 individually and successively for connecting each injection channel 92 with the supply channel 31 and flushing each injector 6 with sealing liquid as already described above in context with the description of the dispensing system 1. Furthermore, the method comprises a step S5 of pumping further sealing liquid into the supply channel 31, wherein excessive sealing liquid potentially including air bubbles can be discharged through the respective injector 6 and into a collection pan (not shown) from which the flushed-out and collected liquid can be pumped or guided into a waste container or the like. Up until here, the method steps S1 to S5 constitute the above mentioned first main phase P1 or priming phase P1, in which the dispensing system 1 including the injectors 6 are primed, i.e. prepared or prefilled in preparation for the actual task of the dispensing system 1.

Subsequently, in the course of the second main phase P2 or filling phase P2, the method comprises an additional step S6 of arranging a microfluidic sample carrier 9 with a filling area 91 prefilled with sample liquid at the dispensing system 1, wherein each injection unit 2 is aligned with each flow channel 92 of the sample carrier 9. Further, the method comprises a step S7 including a reopening of the second valves 5 and a pumping of a preset volume of sealing liquid, such as 105 µl, through the supply channel 31 into the filling area 91 of the microfluidic sample carrier 9, wherein no time delay between opening the second valves 5 and dispensing the liquid into the filling area 91 of the microfluidic sample carrier 9 exists, and wherein a dispensing speed of dispensing sealing liquid from each injector 6, which dispensing speed is generated by pumping the sealing liquid, of 200 µl/s is used. Moreover, the method comprises a step S8 of closing each second valve 5 immediately after the volume delivery for achieving a constant drop break-off at the outlet opening 63 of each injector 6, which closing is carried out immediately after the volume delivery by the liquid pump so that a drop break-off is constant and no dripping occurs, resulting in a time delay between a dispensing action and the closing of each second valve 5 of 0 ms. Furthermore, the method comprises a step S9 of drawing sealing liquid from the supply channel 31 by means of the liquid pump, also referred to as resoaking, and opening the first valve 4 for overpressure compensation, wherein, due to the fast closing of second valves 5, a slight overpressure can be generated within the dispensing system 1, which overpressure can be compensated by the liquid pump which draws a small amount of liquid back into the dispensing system 1 in the opposite direction, and by opening the first valve 4 for a short amount of time afterwards for additional overpressure compensation. Here, a time delay between closing of each second valve 5 and resoaking is 50 ms, a volume to be resoaked is 3 µl, a pump speed used for resoaking is 30 µl/s, and no time delay between an end of the resoaking process and an opening of the first valve 4 occurs. In addition, the method comprises a step S10 of closing the first valve 4, wherein a time delay between an opening and closing of the first valve 4 is 1000 ms. Moreover, the method comprises a step S11 of opening the second valves individually and successively for connecting each injection channel 62 with the supply channel 31. Furthermore, the method comprises a step S12 of drawing further sealing liquid from the supply channel 31 by the liquid pump for removing potential residue sealing liquid at the outlet opening 63 of the injector 6, i.e. the second valve 5 upstream of each injector 6 is reopened in the previous step so that no droplet remains on the injector's outlet opening 63, which droplet could have been caused by a previous drop break-off, such that liquid can be drawn back into the system 1 by the liquid pump in a direction opposite to the dispensing direction, wherein no time delay between the opening of the second valve 5 and a respective resoak occurs, and a liquid volume to be resoaked is 5 µl and a pump speed used for resoaking is 30 µl/s. Here, the step S12 constitutes the final step of the filling phase P2.

Afterwards, i.e. after the method steps S0 to S12 described so far, each second valve 5 provided upstream of a respective injector 6 can be closed again, wherein a delay after step S12 and before closing of each second valve 5 is 1000 ms. Further afterwards, in order to return the liquid pump to its initial position, the changeover valve on the liquid pump can be switched to its suction side, i.e. opposite to its dispensing side, and the liquid pump is moved to its zero point, whereby residual liquid is returned to the liquid reservoir through the liquid connector 35. Then, the changeover valve of the liquid pump can be switched back to the delivery/dispensing side.

Finally, after the steps S0 to S12 of the inventive method as described above, i.e. after the pre-phase S0, the priming phase P1 and the filling phase P2, an additional step S13 can be carried-out, in addition to the inventive method, which step S13 entails applying an overpressure of air by the air supply unit 7 of the dispensing system 1 to the filling area 91 of the microfluidic sample carrier 9 as already described further above, thereby distributing the sealing liquid dispensed into the filling area 91 through each flow channel 92 of the microfluidic sample carrier 9, for example with a constant distribution flow speed. In doing so, the inventive dispensing method as described above can be extended to a method of sealing sample liquid within microwells (not shown) of a microfluidic sample carrier 9, since the step S13 particularly results in the sample liquid prefilled into the filling area 91 of the microfluidic sample carrier 9 being pushed through each flow channel 92 of the microfluidic sample carrier 9 by means of the sealing liquid driven with the constant distribution flow speed provided by the overpressurized air. Thus, the air applied in step S13 in an air-tight manner from the port 34 of the conduit member 3 to the liquid inlets 911 of the filling area 92 of the microfluidic sample carrier 9 pushes the sealing liquid dispensed into each liquid inlet 911 of the microfluidic sample carrier 9 into and through each flow channel 92, and, in turn, the sealing liquid pushes the prefilled sample liquid which has already been sucked into the flow channel at least in part by means of capillary force through each flow channel 92, thereby filling each microwell (not shown) in the microfluidic sample carrier 9 with sample and, subsequently, sealing the same with the following sealing liquid.

With the above described dispensing system 1, the above described microfluidic sample carrier sealing system 10 and the above described respective dispensing method, sealing liquid can be dispensed effectively and without any residue at the outlet opening 63 of each injector 6 into the filling area 91 of a respective microfluidic sample carrier 9 bubble-free, wherein the particular injector geometry as described herein, and also the suitable parameterization as described above in the course of the described method can be used to ensure that the liquid is dispensed without any misalignment of volume.

While the current disclosure has been described in relation to its specific embodiments, it is to be understood that this description is for illustrative purposes only. Accordingly, it is intended that the disclosure be limited only by the scope of the claims appended hereto. In addition, various publications are cited herein, the disclosures of which are incorporated by reference in their entireties.

LIST OF REFERENCE NUMERALS 1 liquid dispensing system
2 interface unit
3 conduit member
31 supply channel of the conduit member
32 liquid distribution channel
33 gas distribution channel
34 port
35 liquid connector
4 first valve/priming valve/waste valve
5 second valve/switching valve
6 injector
61 main body of the injector
611 first end surface of the main body of the injector
612 second end surface of the main body of the injector
613 shoulder of the main body of the injector
62 injection channel of the injector 621 inlet part of the injection channel of the injector
622 middle part of the injection channel of the injector
623 outlet part of the injection channel of the injector
624 outlet chamfer of the injection channel of the injector
625 passage chamfer of the injection channel of the injector
63 outlet opening/nozzle orifice
7 air supply unit
71 air outlet nozzle
8 sealing member
81 inner bore of the sealing member
82 inner rim of the inner bore of the sealing member
9 microfluidic sample carrier
91 filling area of the microfluidic sample carrier
911 liquid inlet of a flow channel of the microfluidic sample carrier
92 flow channel of the microfluidic sample carrier
921 monitoring means
9211 capacitive sensor
9212 first electrode of the capacitive sensor
9213 second electrode of the capacitive sensor
93 outlet area/waste area of the microfluidic sample carrier
931 liquid outlet of a flow channel of the microfluidic sample carrier
94 underside/lower side of the microfluidic sample carrier
95 flow direction of liquid within a flow channel
10 microfluidic sample carrier sealing system
$\varnothing_{in}$ cross section of the inlet part of the injection channel of the injector
$\varnothing_{mid}$ cross section of the middle part of the injection channel of the injector
$\varnothing_{out}$ cross section of the outlet part of the injection channel of the injector
l length of the injection channel of the injector
$l_{in}$ length of the inlet part of the injection channel of the injector
$l_{mid}$ length of the middle part of the injection channel of the injector
$l_{out}$ length of the outlet part of the injection channel of the injector
P1 first main phase/priming phase
P2 second main phase/filling phase
S0 pre-phase/pre-step
S1-S5 method steps of the priming phase
S6-S12 method steps of the filling phase
S13 optional additional compressed-air-applying step
END end of method

The invention claimed is:

1. A dispensing system for providing a preset small volume of liquid ≤200 µl into a filling area of a microfluidic sample carrier comprising at least one flow channel, the system including a liquid reservoir,
a liquid pump connected to the liquid reservoir,
at least one interface unit provided for each flow channel of the microfluidic sample carrier, wherein the liquid is provided to each flow channel via a respective interface unit,
a conduit member comprising a supply channel connecting the liquid pump and each interface unit,
a first valve connected to the supply channel, and
at least one second valve arranged between the supply channel and a respective interface unit,
wherein,
the first valve is a prime valve configured, when opened, to flush the supply channel with sealing liquid by pumping sealing liquid into the supply channel, wherein excessive sealing liquid potentially including air bubbles can be discharged through the open first valve,
each interface unit comprises an injector connected to the conduit member, with each injector comprising a main body and an injection channel provided in the main body,
each injection channel includes an inlet part for receiving liquid from the supply channel, an outlet part for dispensing liquid into a sample carrier liquid inlet, and a middle part for guiding liquid from the inlet part to the outlet part, with the outlet part ending in an outlet opening of the injector, and
a cross section $\varnothing_{in}$ of the inlet part, a cross section $\varnothing_{mid}$ of the middle part and a cross section $\varnothing_{out}$ of the outlet part, wherein each injection channel meet the following conditions:

$$\varnothing_{out} > \varnothing_{in}; \text{ and}$$

$$\varnothing_{out} > \varnothing_{mid}.$$

2. The dispensing system according to claim 1, wherein the cross section $\varnothing_{in}$ of the inlet part, the cross section $\varnothing_{mid}$ of the middle part and the cross section $\varnothing_{out}$ of the outlet part of each injection channel meet the following condition $$\varnothing_{out} > \varnothing_{in} > \varnothing_{mid}.$$

3. The dispensing system according to claim 1, wherein a length $l_{in}$ of the inlet part, a length $l_{mid}$ of the middle part and a length $l_{out}$ of the outlet part of each injection channel meet the following condition $$l_{mid} \geq l_{out}.$$

4. The dispensing system according to claim 1, wherein
a second end surface of the main body of the injector at the outlet opening is kept to a production-related minimum in order to reduce contact surface for the liquid to be dispensed from the outlet opening;
an inner circumference of the downstream end of the outlet part of each injection channel comprises an outlet chamfer enlarging its cross section $\varnothing_{out}$, said outlet chamfer, and/or
a passage chamfer is provided between the inner circumference of the inlet part and the inner circumference of the middle part of each injection channel.

5. The dispensing system according to claim 1, wherein the main body of each injector is made of a plastic material exhibiting low surface energy.

6. The dispensing system according to claim 1, wherein said liquid reservoir is a sealing liquid reservoir for providing highly viscous sealing liquid.

7. The dispensing system according to claim 1, wherein the dispensing system further comprises an air supply unit for providing pressurized air to each flow channel of the microfluidic sample carrier.

8. The dispensing system according to claim 7, wherein each interface unit comprises an air outlet nozzle, and wherein a sealing member is attached to the conduit member and surrounds the outlet part of the injector and the air outlet nozzle of each interface unit, for sealing any liquid or air transfer between the conduit member and the microfluidic sample carrier to the outside.

9. The dispensing system according to claim 1, wherein the liquid pump comprises a controllable volume displacement actuator, and a changeover valve for enabling a changeover of a conveying direction of the liquid pump.

10. The dispensing system according to claim 1, wherein
the first valve is connected to the supply channel at its downstream end,
the second valve is a switching valve, and/or
the first valve additionally acts as a waste valve.

11. A microfluidic sample carrier sealing system for filling a microfluidic sample carrier with a preset small volume of sealing liquid ≤200 µl, the microfluidic sample carrier filling system comprising
the dispensing system according to claim 1, and
a microfluidic sample carrier comprising a filling area, an outlet area, and at least one flow channel, at least one liquid inlet of the filling area being prefilled with sample liquid,
wherein monitoring means are provided for each flow channel of the microfluidic sample carrier, which monitoring means are for monitoring a filling of the respective flow channel.

12. A method of dispensing sealing liquid into a microfluidic sample carrier with a dispensing system according to claim 1, including the steps of
(S1) opening the first valve of the dispensing system,
(S2) flushing the supply channel with sealing liquid by pumping sealing liquid into the supply channel, wherein excessive sealing liquid potentially including air bubbles can be discharged through the open first valve,
(S3) closing the first valve, thereby generating a closed hydraulic sealing liquid column within the supply channel,
(S4) opening second valves individually and successively for connecting each injection channel with the supply channel and flushing each injector with sealing liquid, and
(S5) pumping further sealing liquid into the supply channel, wherein excessive sealing liquid potentially including air bubbles can be discharged through the respective injector, and closing the second valves again,
wherein the method further comprises the steps of
(S6) arranging a microfluidic sample carrier to be filled with sealing liquid and comprising a filling area, an outlet area, and at least one flow channel, with at least one liquid inlet of the filling area being prefilled with sample liquid at the dispensing system, wherein each injector is aligned with a liquid inlet of each flow channel,
(S7) opening the second valves and pumping a preset volume of sealing liquid through the supply channel into the filling area of the microfluidic sample carrier,
(S8) closing each second valve immediately after the volume delivery for achieving a constant drop break-off at the outlet opening of each injector,
(S9) drawing sealing liquid from the supply channel by the liquid pump and opening the first valve, for overpressure compensation,
(S10) closing the first valve,
(S11) opening the second valves individually and successively for connecting each injection channel with the supply channel, and
(S12) drawing further sealing liquid from the supply channel by the liquid pump for removing potential residue sealing liquid at the outlet opening of the injector.

13. The method according to claim 12, wherein the dispensing system further comprises an air supply unit for providing pressurized air and wherein, in a further step (S13), an overpressure of air is applied by the air supply unit of the dispensing system above the filling area of the microfluidic sample carrier, thereby distributing the sealing liquid dispensed into the filling area through each flow channel of the microfluidic sample carrier with a constant distribution flow speed, wherein the sample liquid pre-filled into the filling area of the microfluidic sample carrier is pushed through each flow channel of the microfluidic sample carrier by the sealing liquid with constant distribution flow speed.

14. The method according to claim 12, wherein the steps (S1-S5) of opening the first valve, flushing the supply channel with sealing liquid, closing the first valve, opening the second valves individually and successively, pumping further sealing liquid into the supply channel and closing the second valves again constitute an initial priming phase (P1) of the dispensing system, and wherein the remaining steps (S6-S12) constitute a filling phase (P2) of filling sealing liquid into a respective microfluidic sample carrier.

15. The method according to claim 12, wherein a filling phase (P2) of each flow channel is monitored by the respective monitoring means.

* * * * *